United States Patent [19]

Yamauchi et al.

[11] Patent Number: 5,294,745
[45] Date of Patent: Mar. 15, 1994

[54] INFORMATION STORAGE MEDIUM AND APPARATUS FOR REPRODUCING INFORMATION THEREFROM

[75] Inventors: Keiichi Yamauchi; Toshihiko Shimizu; Satomi Sudo, all of Kawagoe, Japan

[73] Assignee: Pioneer Electronic Corporation, Tokyo, Japan

[21] Appl. No.: 725,862

[22] Filed: Jul. 2, 1991

[30] Foreign Application Priority Data

Jul. 6, 1990 [JP] Japan .................. 2-179791
Jul. 6, 1990 [JP] Japan .................. 2-179796

[51] Int. Cl.$^5$ ................................ G10H 7/00
[52] U.S. Cl. ......................... 84/601; 84/639; 84/641; 84/645; 84/470 R
[58] Field of Search ......... 84/477 R, 470 R, 600–602, 84/604, 634, 639, 641, 645

[56] References Cited

U.S. PATENT DOCUMENTS

| | | | |
|---|---|---|---|
| 3,756,716 | 9/1973 | Gitchel | 353/15 |
| 3,877,338 | 4/1975 | David | 84/462 |
| 4,331,061 | 5/1982 | Morgando | 84/470 R |
| 4,527,274 | 6/1985 | Gaynor | 381/51 |
| 4,731,847 | 3/1988 | Lybrok et al. | 381/51 |
| 4,744,281 | 5/1988 | Isozaki | 84/DIG. 4 |
| 4,995,026 | 2/1991 | Makabe et al. | 369/70 |
| 5,033,036 | 7/1991 | Ohmori et al. | 369/3 |

FOREIGN PATENT DOCUMENTS 61-212274 3/1988 Japan .
63-091871 4/1988 Japan .
1184685 7/1989 Japan .

*Primary Examiner*—William M. Shoop, Jr.
*Assistant Examiner*—Brian Sircus
*Attorney, Agent, or Firm*—Sughrue, Mion, Zinn, Macpeak & Seas

[57] ABSTRACT

An information storage medium has a storage area for storing audio information, the storage area being divided into a plurality of sections. At least either one of the sections stores musical accompaniment information and lead voice information in which word-of-song information to be reproduced in relation to the musical accompaniment information is pronounced. The lead voice information is stored in a position which precedes, in time, a position where the word-of-song information is to be reproduced. An apparatus for reproducing information from the information storage medium includes an information reading unit, an information demodulating unit, and a control unit.

16 Claims, 15 Drawing Sheets

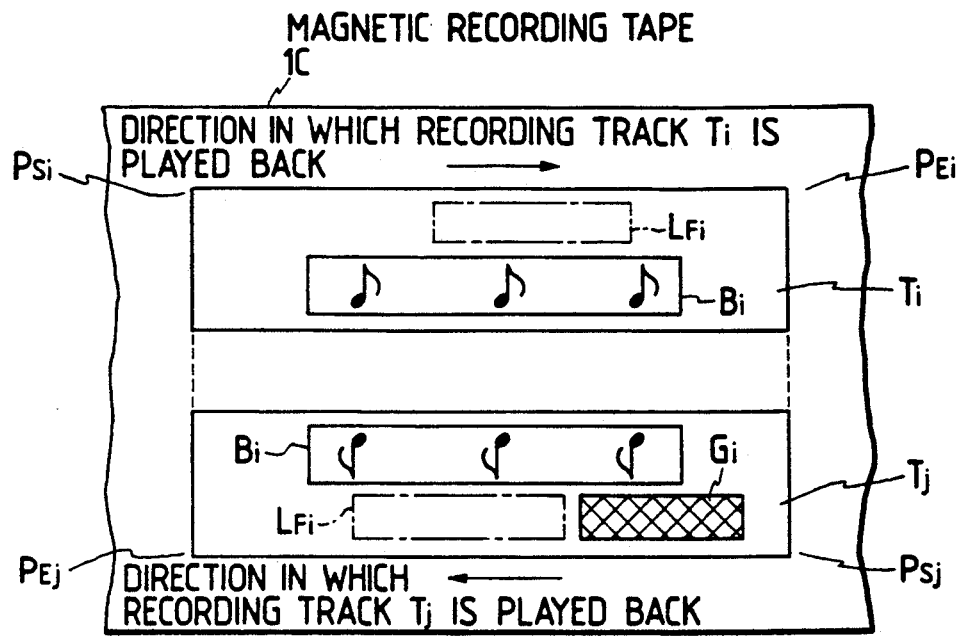
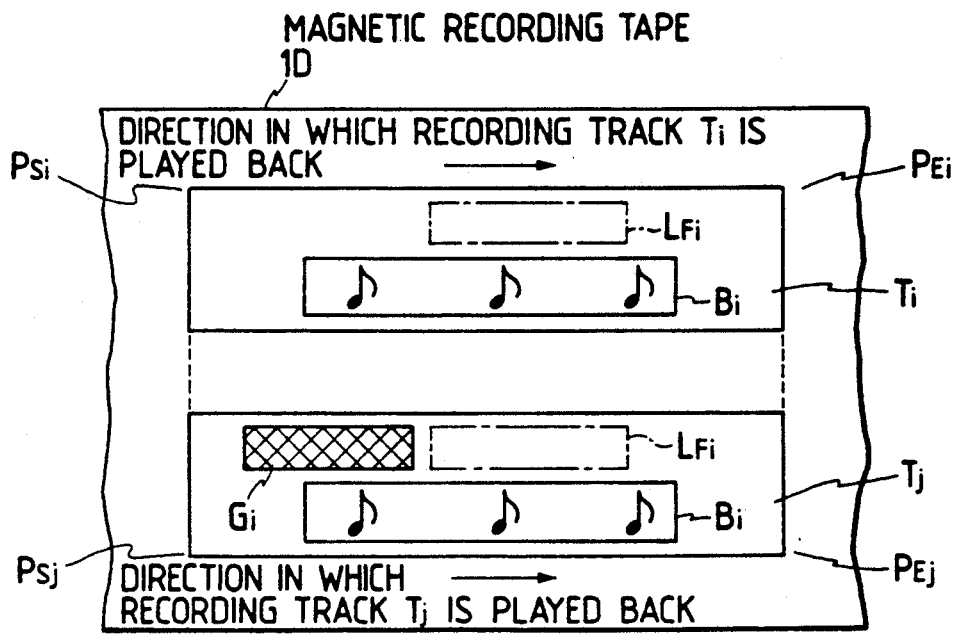

FIG. 10

| | SOUND QUALITY LEVEL | TYPE | SAMPLING FREQUENCY (kHz) | QUANTIZING NUMBER (BIT) | BIT REDUCTION RATIO (STEREO/MONO) | AUDIO CHARACTERISTICS | |
|---|---|---|---|---|---|---|---|
| | | | | | | DYNAMIC RANGE (dB) | FREQUENCY RANGE (kHz) |
| | CD DIGITAL AUDIO (SOUND QUALITY CORRESPONDING TO PRESENT 16-BIT PCM) | PCM | 44.1 | 16 | 1 | 98 | 20 |
| A | HIFI (SOUND QUALITY CORRESPONDING TO LP RECORD) | ADPCM | 37.8 | 8 | 1/2 / 1/4 | 90 | 17 |
| B | MID-HIFI (SOUND QUALITY CORRESPONDING TO FM BROADCAST) | ADPCM | 37.8 | 4 | 1/4 / 1/8 | 90 | 17 |
| C | SPEECH (SOUND QUALITY CORRESPONDING TO AM BROADCAST) | ADPCM | 18.9 | 4 | 1/8 / 1/16 | 50 | 8.5 |

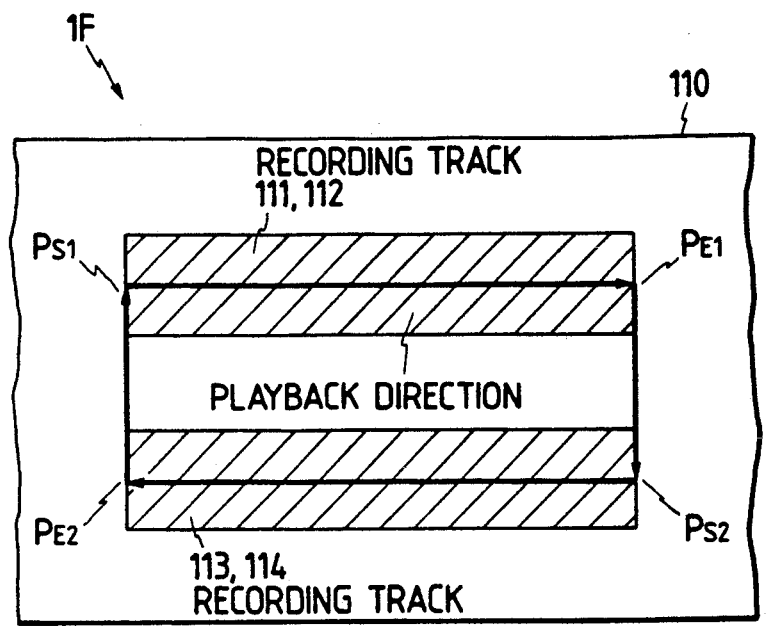
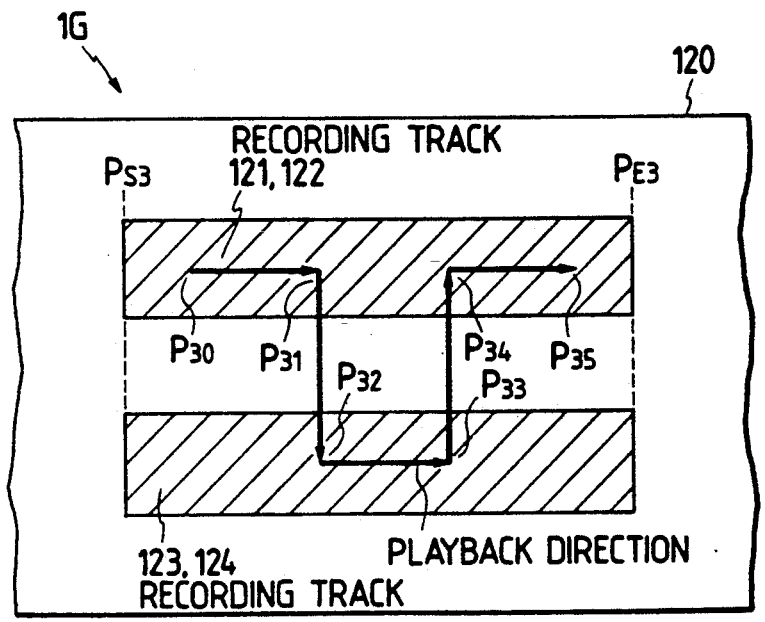

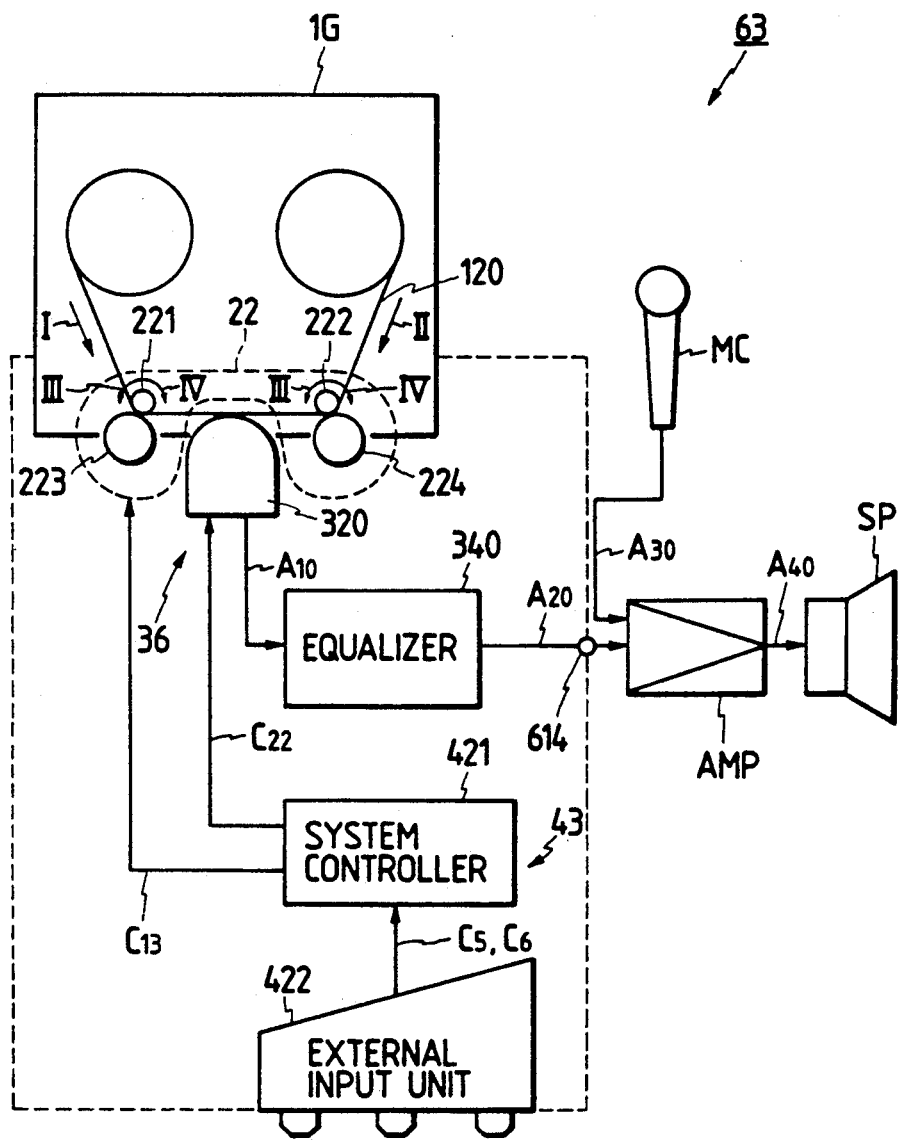

INFORMATION STORAGE MEDIUM AND APPARATUS FOR REPRODUCING INFORMATION THEREFROM

BACKGROUND OF THE INVENTION

The present invention relates to an information storage medium and an apparatus for reproducing information from the information storage medium, and more particularly to an information storage medium suitable for storing musical accompaniments, so-called "karaoke", and an apparatus for reproducing information from the information storage medium.

A conventional apparatus for playing back prerecorded musical accompaniments, or a musical accompaniment playback apparatus, reproduces such prerecorded musical accompaniments by playing back information recording medium, such as magnetic tapes, video disks, etc., on which only musical accompaniments are recorded. Such a musical accompaniment playback apparatus includes an amplifier connected to a microphone and a loudspeaker, and mixes vocal signals supplied from the microphone with signals o reproduced musical accompaniments, amplifies the mixed signals, and supplies the amplified signals to the loudspeaker to produce audible sounds.

When a user of the musical accompaniment playback apparatus wants to sing vocal passages of a desired music piece or song recorded in an information storage medium, it is necessary for the user to confirm the words with a song book, subtitles displayed on a video screen or the like.

Some users may desire to use the musical accompaniment playback apparatus in passenger oars. It would be convenient if the user were able to know the words of a desired music piece or song without song book, displayed subtitles, or the like. Certain musical accompaniments do not contain clear information that would indicate a time to start singing. Therefore, it would be advantageous if musical accompaniments would give the user a clue to the timing about when to start to sing the song.

SUMMARY OF THE INVENTION

It is an object of the present invention to provide an information storage medium which is capable of giving the user information, other than visual information, as to the words of a song, and an information reproducing apparatus for reproducing information from such an information storage medium.

According to one aspect of the present invention, there is provided an information storage medium comprising a storage area which stores musical accompaniment information and lead voice information in which word-of-song information to be reproduced in relation to the musical accompaniment information is pronounced, the lead voice information being stored in a position which precedes, in time, a position where the word-of-song information is to be reproduced. The word-of-song information may comprise a plurality of word-of-song information pieces which are discrete in time. The lead voice information comprises a plurality of lead voice information pieces which correspond respectively to the word-of-song information pieces, the lead voice information pieces being stored in respective positions which precede, in time, positions where the corresponding word-of-song information pieces are to be reproduced. The information storage medium may includes an optical disk according to Adaptive Differential Pulse Code Modulation system.

According to another aspect of the present invention, there is also provided a digital information storage medium comprising a storage area which stores audio information that is pulse-code-modulated, the storage area being divided into a plurality of sections, at least either one of the sections storing each of a plurality of musical accompaniment information pieces and each of a plurality of lead voice information pieces in which each of a plurality of word-of-song information pieces to be reproduced in relation to the each of a plurality of musical accompaniment information pieces is respectively pronounced, the each of a plurality of lead voice information pieces being respectively stored in a position which precedes, in time, a position where the each of a plurality of word-of-song information pieces is to be reproduced. The digital information storage medium may include an optical disk according to Adaptive Differential Pulse Code Modulation system.

According to still another aspect of the present invention, there is also provided a digital information storage medium comprising a storage area which stores audio information that is pulse-code-modulated. The storage area is divided into a plurality of sections, the sections include a first group and a second group. Each section of the first group stores each of a plurality of musical accompaniment information pieces and each of a plurality of lead voice information pieces in which each of a plurality of word-of-song information pieces to be reproduced in relation to the each of a plurality of musical accompaniment information pieces is pronounced, said each of a plurality of the lead voice information pieces is respectively stored in a position which precedes, in time, a position where said each of a plurality of the word-of-song information pieces is to be reproduced. Each section of the second group stores only said each of a plurality of musical accompaniment information pieces. The digital information storage medium may include an optical disk according to Adaptive Differential Pulse Code Modulation system.

An apparatus for reproducing information from the above digital information storage medium comprises information reading means for reading information from the information storage medium, information demodulating means for demodulating the information read by the information reading means and outputting the demodulated information, and control means for controlling the information reading means to selectively read the information from the section which stores the musical accompaniment information pieces and the lead voice information pieces, and the sections other than the section. The apparatus may comprise information reading means for reading information from the information storage medium, information demodulating means for demodulating the information read by the information reading means and outputting the demodulated information, and control means for controlling the information reading means to selectively read the information from the first group which stores the musical accompaniment information pieces and the lead voice information pieces, and the second group which stores the musical accompaniment pieces only. The apparatus may further comprise command input means for input of a command to select either reproduction of the first group or reproduction of the second group, accoustoelectric transducer means for transducing voice sound sung in relation to the musical accompaniment information into electric voice information, and information mixing means for mixing the musical accompaniment information with the electric voice information.

According to still another embodiment of the present invention, there is further provided a magnetic recording tape comprising at least two recording tracks, at least one of the recording tracks storing only musical accompaniment information, the other of the recording tracks storing musical accompaniment information and lead voice information in which word-of-song information to be reproduced in relation to the musical accompaniment information is pronounced, the lead voice information being stored in a position which precedes, in time, a position where the word-of-song information is to be reproduced, the one recording track having reproduction starting point aligned with a reproduction ending point on the other recording track, the one recording track having a reproduction ending point aligned with a reproduction starting point on the other recording track.

An apparatus for reproducing recorded information from the above magnetic recording tape comprises tape driving means for transporting the magnetic recording tape, magnetic signal reading means for reading a magnetic signal from the magnetic recording tape at a predetermined reading place while the magnetic recording tape is being transported by the tape driving means, and outputting an electric signal representing the magnetic signal, and control means for starting to reproduce the information from the other recording track from the reproduction starting point thereon when the reproduction ending point on the one recording track is reached to the predetermined reading place, and for starting to reproduce the information from the one recording track from the reproduction starting point thereon when the reproduction ending point on the other recording track is reached with respect to the predetermined reading place. The apparatus may further comprise accoustoelectric transducer means for transducing voice sound sung in relation to the musical accompaniment information into electric voice information, and information mixing means for mixing the musical accompaniment information with the electric voice information.

According to still another aspect of the present invention, &here is provided a magnetic recording tape comprising at least two recording tracks, at least one of the recording tracks storing only musical accompaniment information, the other of the recording tracks storing musical accompaniment information and lead voice information in which word-of-song information to be reproduced in relation to the musical accompaniment information is pronounced, the lead voice information being stored in a position which precedes, in time, a position where the word-of-song information is to be reproduced, said one recording track having a reproduction starting point aligned with a reproduction staring point on the other recording track, the one recording track having a reproduction ending point aligned with a reproduction ending point on the other recording track.

An apparatus for reproducing recorded information from the aforesaid magnetic recording tape driving means for transporting the magnetic recording tape, magnetic signal recording means for reading a magnetic signal from the magnetic recording tape at a predetermined reading place while the magnetic recording tape is being transported by the tape driving means, and outputting an electric signal representing the magnetic signal, and control means for starting to reproduce the information from the other recording to reproduce the information from the other recording track from a first point thereon when a second point, aligned with the first point, on the one recording track is reached with respect to the predetermined reading place while the one recording track is being played back, and for starting to reproduce the information from the one recording track from a third point thereon when a fourth point, aligned with the third point, on the other recording track is reached with respect to the predetermined reading place while the other recording track is being played back. The apparatus may further comprise command input means for input of a command to appoint the first and second point, or the third and fourth point, accoustoelectric transducer means for transducing voice sound sung in relation to the musical accompaniment information into electric voice information, and information mixing means for mixing the musical accompaniment information with the voice information.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a diagram of an information storage medium according to a fourth embodiment of the present invention.

FIG. 6 is a diagram of an information storage medium according to a sixth embodiment of the present invention.

FIG. 10 is a diagram showing a table of ADPCM sound quality levels and audio characteristics.

FIG. 15 is a diagram showing the manner in which the compact cassette tape shown in FIGS. 12(A) through 12(D) operates.

FIG 18 is a block diagram of a karaoke or musical accompaniment playback apparatus as an apparatus for reproducing information according to a thirteenth embodiment of the present invention.

FIG. 20 is a diagram showing the manner in which the musical accompaniment playback apparatus shown in FIG. 18 operates, using the compact cassette tape shown in FIGS. 17(A) through 17(D).

DETAILED DESCRIPTION OF THE PREFERRED EMBODIMENTS

First Embodiment

Figure 1:
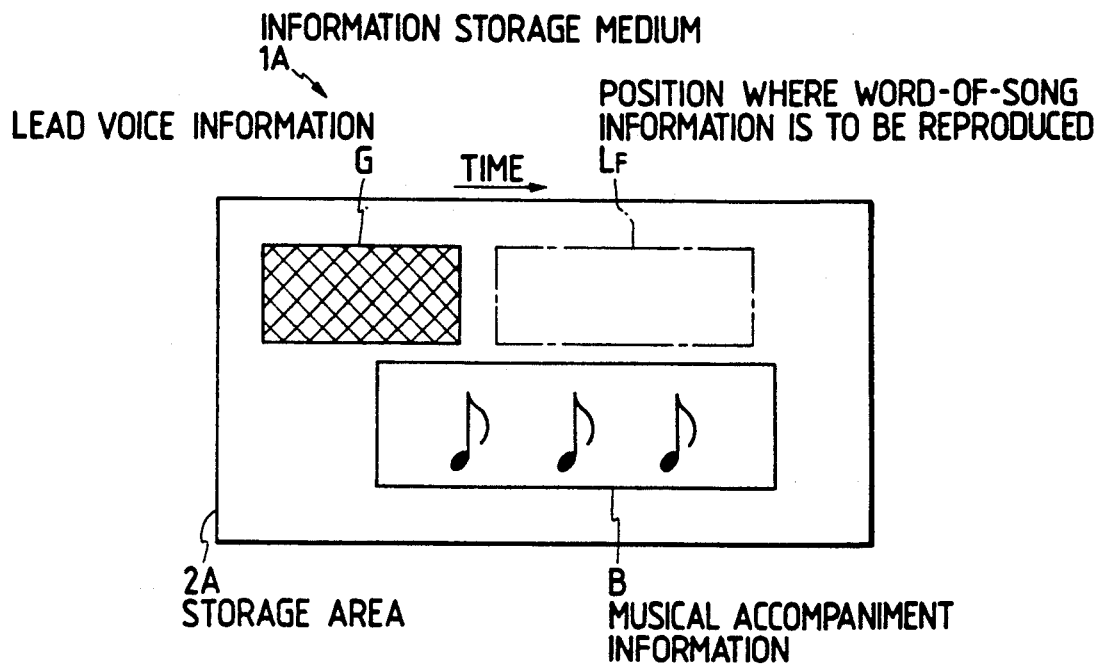
FIG. 1 is a diagram of an information storage medium according to a first embodiment of the present invention.

FIG. 1 shows an information storage medium according to a first embodiment Of the present invention.

The information storage medium, generally denoted at 1A. has a storage area 2A which stores musical accompaniment information B and lead voice information G. The lead voice information is voice information which is pronounced. The contents of the lead voice information G are related to word-of-song information to be reproduced in relation to the musical accompaniment information B. The lead voice information G is stored in a position which precedes, in time, a position $L_F$ where the word-of-song information is to be reproduced.

When the information storage medium 1A is played back to reproduce the information stored in the storage area 2A with time, the lead voice information G and the musical accompaniment information B are reproduced. A user of the information storage medium IA can now sing a stored music piece or song while the word-of-song information is being reproduced, to the musical accompaniment information B. The lead voice information G is pronounced information relative to the word-of-song information to be reproduced, e.g., the words of the song. As time goes on, the lead voice information G is first reproduced, and then the position $L_F$ where the word-of-song-information is to be reproduced. In the meantime, the musical accompaniment information B is being reproduced in the background. Therefore, the user is able to know the words of the song to be sung, according to the lead voice reproduced by &he lead voice information G, before singing the words of the song. The user can thus accurately sing the words of the song even without a song book, displayed subtitles, or other information for assisting. Consequently, the information storage medium IA is used to play back musical accompaniments or karaoke music with lead voices that are a vocal representation of the words.

Second Embodiment

Figure 2:
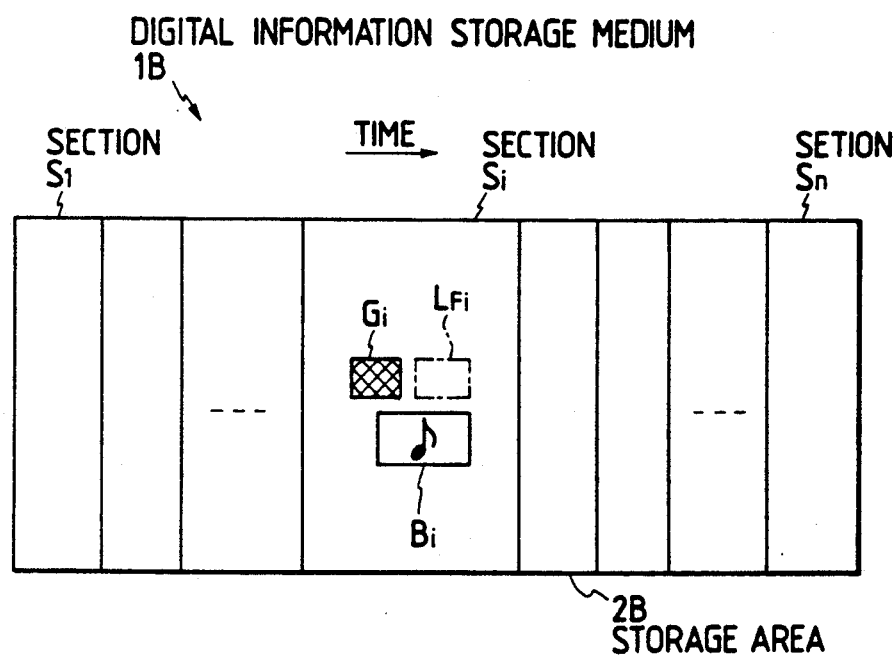
FIG. 2 is a diagram of an information storage medium according to a second embodiment of the present invention.

FIG. 2 shows a digital information storage medium 1B according to a second embodiment of the present invention The digital information storage medium 1B has a storage area 2B which stores audio information that is recorded by pulse code modulation. The storage area 2B is divided into a plurality of sections $S_1-S_n$. Some sections $S_i$ of the sections $S_1-S_n$ store musical accompaniment information piece $B_i$ and lead voice information piece $G_i$. The lead voice information is voice information which is pronounced. The contents of the lead voice information piece $G_i$ are related to word-of-song information to be reproduced in relation to the musical accompaniment information piece $B_i$. The lead voice information piece $G_i$ is stored in a position which precedes, in time, a position $L_{Fi}$ where the word-of-song information is to be reproduced.

The digital information storage medium 1B includes those sections $S_i$ which store the musical accompaniment information piece $B_i$ and the lead voice information piece $G_i$, and other sections. When the digital information medium 1B is played back, if the sections $S_i$ are selected and the information stored therein is reproduced, the user of the information storage medium 1B is able to know the words of the stored song or music piece ahead of time. The other sections, denoted at $S_j$, may also be selected. If only musical accompaniment information which is the same information as that stored in the sections $S_i$, is stored in the other sections $S_j$, and the other sections $S_j$ are selected, then only musical accompaniments can be played back in an ordinary manner.

Third Embodiment

Figure 3:
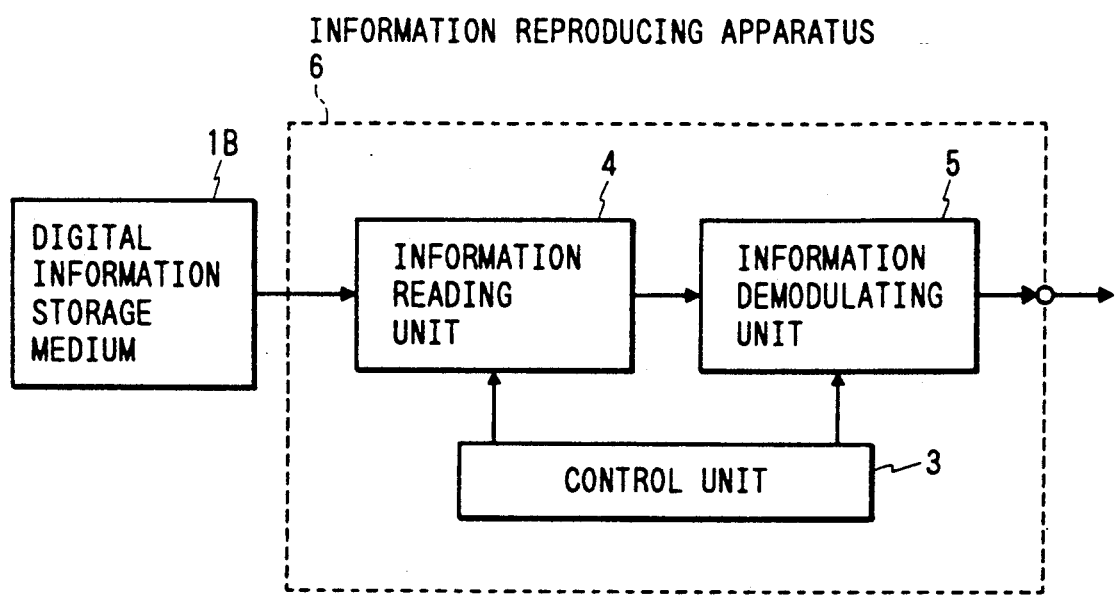
FIG. 3 is a block diagram of an information reproducing apparatus according to a third embodiment of the present invention.

FIG. 3 shows an information reproducing apparatus according to a third embodiment of the present invention. The information reproducing apparatus, generally designated by the reference numeral 6, comprises an information reading unit 4, an information demodulating unit 5 and a control unit 3.

In operation, the information reading unit 4 reads the information from the information storage medium 1B, for example, shown in FIG. 2. The information read by the information reading unit 4 is input to the information demodulating unit 5, which demodulates the information and outputs the demodulated information. The control unit 3 selects those sections of the information storage medium 1B which store musical accompaniment information pieces and lead voice information pieces, or the other sections of the information medium 1B. If the other sections store only musical accompaniment information pieces, then the control unit can selectively reproduce musical accompaniment information pieces together with lead voice information pieces, and only musical accompaniment information pieces.

Fourth Embodiment

FIG. 4 shows an information storage medium according to a fourth embodiment of the present invention, the information storage medium being in the form of a magnetic recording tape. The magnetic recording tape, denoted at 1C, has at least two parallel recording tracks $T_i$, $T_j$. Either one of the recording tracks $T_i$ stores only musical accompaniment information $B_i$, and the other recording track $T_j$ stores musical accompaniment information $B_i$ and lead voice information $G_i$ which is word-of-song information to be reproduced in relation to the musical accompaniment information $B_i$. The lead voice information $G_i$ is information which is pronounced. The lead voice information $G_i$ is stored in a position which precedes, in time, a position where the word-of-song information is to be reproduced. The recording track $T_i$ has a reproduction starting point $P_{Si}$ and a reproduction ending point $P_{Ei}$, and the recording track $T_j$ has a reproduction starting point $P_{Sj}$ and a reproduction ending point $P_{Ej}$. The reproduction starting point $P_{Si}$ of the recording track $T_i$ is transversely aligned with the reproduction ending point $P_{Ej}$ of the recording track $T_j$, and the reproduction ending point $P_{Ei}$ of the recording track $T_i$ is transversely aligned with the reproduction starting point $P_{Sj}$ of the recording track $T_j$.

Fifth Embodiment

Figure 5:
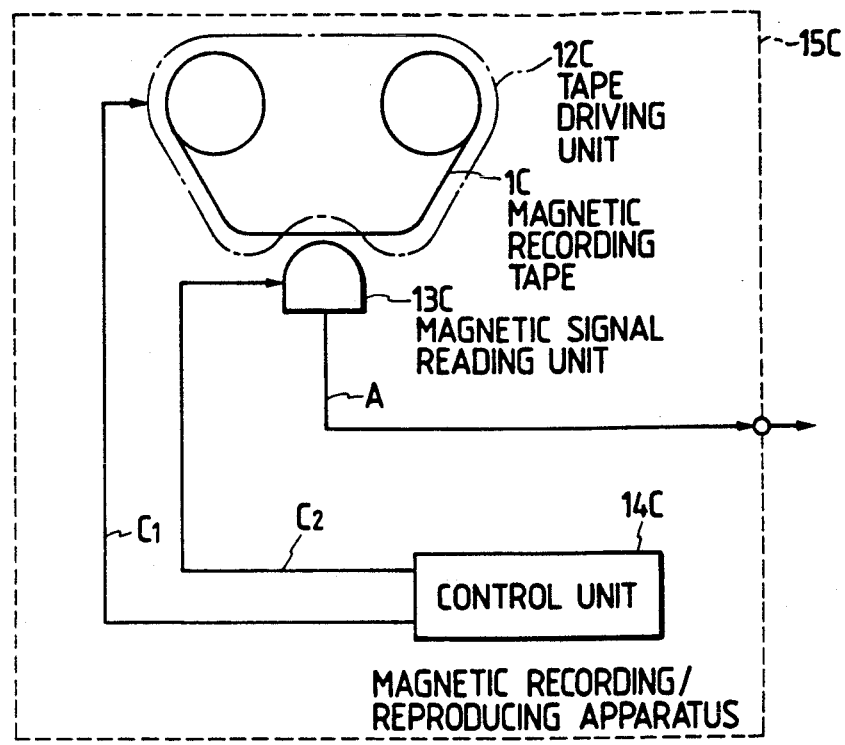
FIG. 5 is a block diagram of an information reproducing apparatus according to a fifth embodiment of the present invention.

FIG. 5 shows a magnetic recording/reproducing apparatus, as an information reproducting apparatus according to a fifth embodiment of the present invention, for recording information on or reproducing information from the magnetic recording tape 1C shown in FIG. 4. The magnetic recording/reproducing apparatus, generally denoted at 15C, comprises a tape driving unit 12C, a magnetic signal reading unit 13C, and a control unit 140.

Operation of the magnetic recording/reproducing apparatus 15C shown in FIG. 5 with the magnetic recording tape 1C shown in FIG. 4 will be described below. When the magnetic recording tape 1C is transported by the tape driving unit 12C of the magnetic recording/reproducing apparatus 15C, the magnetic signal reading unit 13C starts reproducing the information recorded in the recorded track $T_i$ from the reproduction starting point $P_{Si}$. The magnetic signal reading unit 13C outputs a readout signal A to an external device. Thus, the musical accompaniment information piece $B_i$ stored in the recording track $T_i$ is reproduced. The user of the magnetic recording/reproducing apparatus 15C can sing the song while reproducing the word-of-song information, to the musical accompaniment information piece $B_i$ which is being reproduced. The recording track $T_i$ is played back until the reproduction ending point $P_{Ei}$ thereof is reached. When the reproduction ending point $P_{Ei}$ is reached, the control unit 14C of the magnetic recording/reproducing apparatus 15C applies a control signal $C_1$ to the tape driving unit 12C to reverse the direction in which the magnetic recording tape 1A is transported. At the same time, the control unit 14C applies a control signal $C_2$ to the magnetic signal reading unit 13C to switch from the recording track $T_i$ to the recording track $T_j$. Since the reproduction ending point $P_{Ei}$ of the recording track $T_i$ is aligned with the reproduction starting point $P_{Sj}$ of the recording track $T_j$, the position to read information switches to the reproduction starting point $P_{Sj}$. The magnetic recording tape 1C now starts moving back in a reverse direction to the reproduction ending point $P_{Ej}$. The information stored in the recording track $T_j$ is reproduced in the direction from the point $P_{Sj}$ to the point $P_{Ej}$. the musical accompaniment information $B_i$ and the lead voice information piece $G_i$ are recorded in the recording track $T_j$. The lead voice information piece $G_i$ is relative to word-of-song information to be reproduced that the user sings to the musical accompaniment information piece $B_i$, and is stored in the position which is ahead of the position where the word-of-song information is to be reproduced. Therefore, since the lead voice information piece $G_1$ allows the user to know the words of a song to be sung ahead of time, the user can accurately sing the words of the song according to the lead voice information piece $G_1$ as it is progressively reproduced. In this manner, the recording track $T_j$ is played back until the reproduction ending point $P_{Ej}$ thereof is reached. When the reproduction ending point $P_{Ej}$ is reached, the control unit 14C outputs control signals $C_1$, $C_2$ again to reproduce the recording track $T_i$ from the point $P_{Si}$ to the point $P_{Ei}$, because the reproduction ending point $P_{Ej}$ of the recording track $T_j$ is aligned with the reproduction starting point $P_{Si}$ of the recording track $T_i$. The recording track $T_i$ where only the musical accompaniment information piece $B_i$ is recorded and the recording track $T_j$ where both the musical accompaniment information piece $B_i$ and the lead voice information piece $G_i$ are recorded can thus be played back alternately or endlessly.

Sixth Embodiment

FIG. 6 shows an information storage medium according to a sixth embodiment of the present invention. The magnetic recording tape, denoted at 1D, which is also in the form of a magnetic tape, has at least two parallel recording tracks $T_i$, $T_j$. Either one of the recording tracks $T_i$ stores only musical accompaniment information piece $B_i$, and the other recording track $T_j$ stores musical accompaniment information piece $B_i$ and lead voice information piece $G_i$ which is word-of-song information to be reproduced in relation to the musical accompaniment information piece $B_i$. The lead voice information $G_i$ is information which is pronounced. The lead voice information piece $G_i$ is stored in a position which precedes, in time, a position where the word-of-song information is to be reproduced. The recording track $T_i$ has a reproduction starting point $P_{Si}$ and a reproduction ending point $P_{Ei}$, and the recording track $T_j$ has a reproduction starting point $P_{Sj}$ and a reproduction ending point $P_{Ej}$. The reproduction starting point $P_{Si}$ of the recording track $T_i$ is transversely aligned with the reproduction starting point $P_{Sj}$ of the recording track $T_j$, and the reproduction ending point $P_{Ei}$ of the recording track $T_i$ is transversely aligned with the reproduction ending point $P_{Ej}$ of the recording track $T_j$.

Seventh Embodiment

Figure 7:
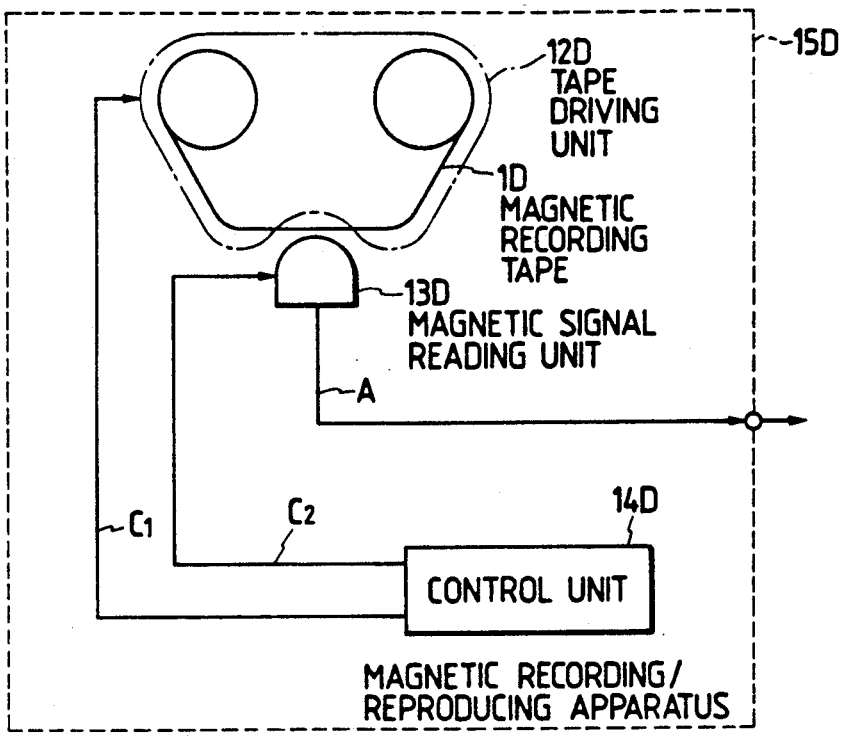
FIG. 7 is a block diagram of an information reproducing apparatus according to a seventh embodiment of the present invention.

FIG. 7 shows a magnetic recording/reproducing apparatus, as an information reproducing apparatus according to a seventh embodiment of the present invention, for recording information on or reproducting information from the magnetic recording tape 1D shown in FIG. 6. The magnetic recording/reproducing apparatus, generally denoted at 15D, comprises a tape driving unit 12D, a magnetic signal reading unit 13D, and a control unit 14D.

The magnetic recording/reproducing apparatus 15D shown in FIG. 5 with the magnetic recording tape shown in FIG. 6 operates as follows: When the magnetic recording tape 1D is transported by the tape driving unit 12D of the magnetic recording/reproducing apparatus 15D, the magnetic signal reading unit 13D starts reproducing the information recorded in the recording track $T_i$ from the reproduction starting point $P_{Si}$. Therefore, only the musical accompaniment information piece $B_i$ is reproduced, and a user can sing the words of the song to the reproduced musical accompaniment information piece $B_i$. Before the reproduction ending point $P_{Ei}$ of the recording track $T_i$ is reached, the control unit 14D may output a control signal $C_2$ to the magnetic signal reading unit 13D to switch from the recording track $T_i$ to the recording track $T_j$ for the reading of the information. When the control signal $C_2$ is output, the information starts being reproduced from the recording track $T_j$ from the position thereof which is transversely aligned with the position of the recording track $T_i$ where the shifting has occurred. The user is now able to know the words of a song to be sung ahead of time, according to the lead voice information piece $G_i$, and the user can accurately sing the words of the song according to the lead voice information piece $G_i$ as it is progressively reproduced. At this time, both the musical accompaniment information piece $B_i$ and the lead voice information piece $G_i$ are reproduced. Therefore, the user can alternately switch between the recording track $T_i$ where only the musical accompaniment information piece $B_i$ is recorded and the recording track $T_j$ where both the musical accompaniment information piece $B_i$ and the lead voice information piece $G_i$ are recorded, while either one of the recording tracks $T_i$, $T_j$ is being reproduced.

Eighth Embodiment

Figure 8:
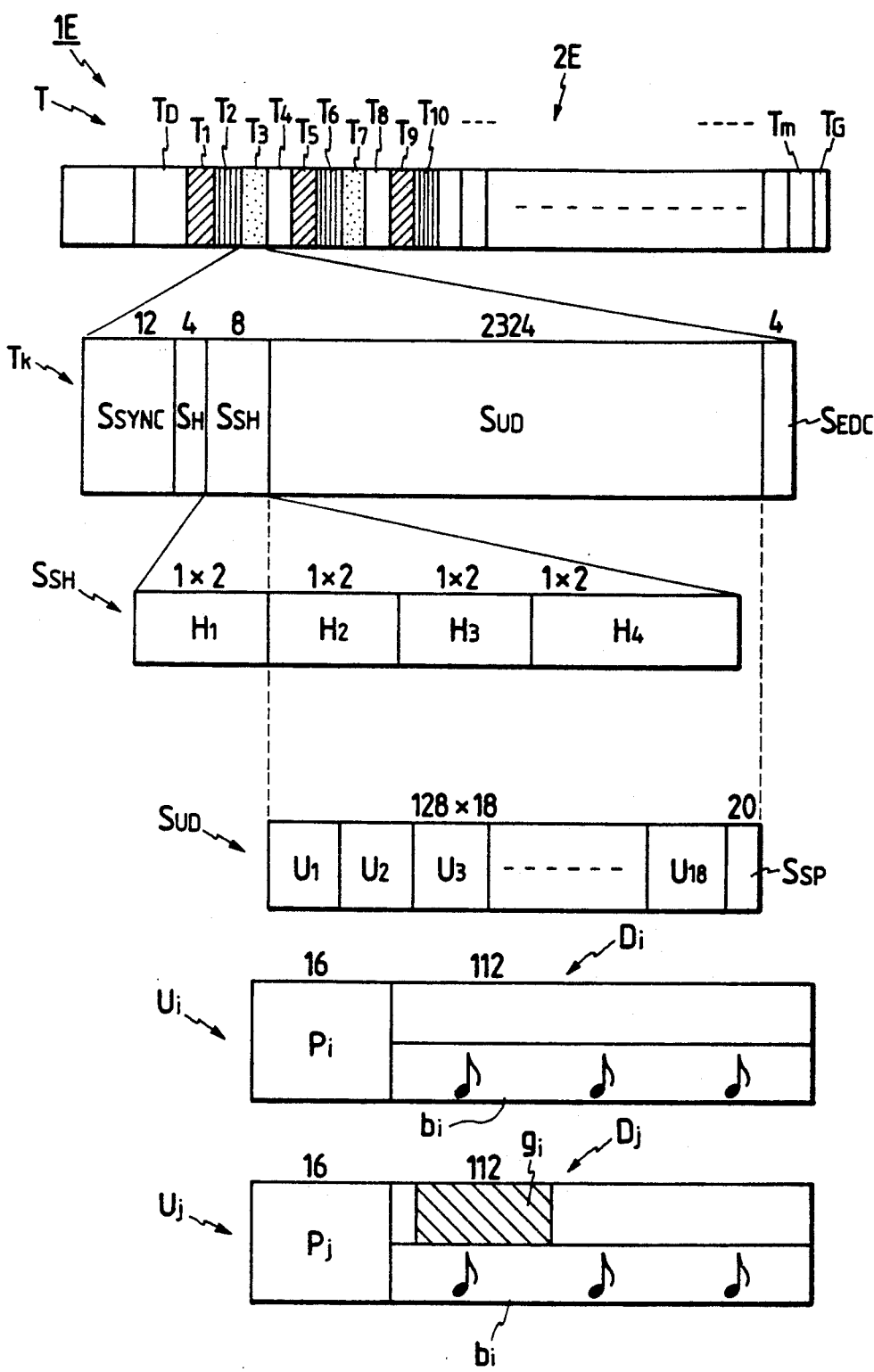
FIG. 8 is a diagram showing a data structure of digital audio information stored in a CD-ROMXA disk as an information storage medium according to an eighth embodiment of the present invention.

FIG. 8 shows a data structure of an information storage medium according to an eighth embodiment of the present invention, the information storage medium being in the form of a CD-ROMXA disk, generally denoted at 1E.

A CD-ROM is an information storage medium that employs a compact disk (CD), which has been widely used as a digital audio disk, as a ROM (read-only memory) for only reading stored digital information. Standards for CD-ROMs were established in 1985. CD-ROMs are finding widespread use in various applications, and are advantageous in that they provide a very large storage capacity, are highly reliable as they operate optically, can access desired information quickly, are available in a large number of duplicates, and can be used to establish an inexpensive reproduction system.

Information storage mediums employ a format based on the CD-ROM and include a CD-I (CD-Interactive) and a CD-ROMXA. Both can record and reproduce voice sound/audio information and image information, which are modulated according to ADPCM (Adaptive Differential Pulse Code Modulation) (see Nikkei Electronics, May 15, 1989, pages 195–200).

The data/sector structure of a storage area in a CD-ROMXA is illustrated in FIG. 8.

According to the CD signal format, 98 frames of subcodes are handled as one block, and one block corresponds to 1/75 second. Since $$44.1 \times 10^3 \times 16 \times 2 \times 1/75 \times 1/8 = 2352,$$

data represented by 2352 bytes can be recorded in one block on a CD. In the above equation, $44.1 \times 10^3$ indicates a sampling frequency, 16 a quantizing number, 2 left and right channels (L and R) of a stereophonic system, 1/75 time (second), and 1/8 a conversion rate between bits and bytes.

On the CD-ROMXA disk, each block is referred to as a sector, and user data are recorded in each sector. There are two standards, Mode 1 and Mode 2 for CD-ROMXA disks depending on the size of the user data area, etc., and there are two standards, Form 1 and Form 2 for Mode 2. In a storage area 2E of the CD-ROMXA disk, a volume descriptor is stored in Mode 1, and image information and audio information are stored in Mode 2 Form 2.

The CD-ROMXA disk, designated by 1E in FIG. 8, has tracks T in the storage area 2E, each track T having a volume descriptor $T_D$, sectors $T_1 - T_m$, and a gap $T_G$. The volume descriptor $T_D$ is an area for storing an identification code indicating the CD-ROMXA disk, a flag, a startup directory, etc., and is recorded in Mode 1 or Mode 2 Form 1. The sector $T_1 - T_m$ (e.g., $T_k$) store image and voice sound or audio signals, and are recorded in Mode 2 Form 2, and each contains a synchronizing signal $S_{SYNC}$, a header $S_H$, a subheader $S_{SH}$, user data $S_{UD}$, and an error detecting code $S_{EDC}$. The synchronizing signal $S_{SYNC}$ is composed of 12 bytes, and serves to distinguish sectors. The header $S_H$ is composed of 4 bytes, three for storing address information similar to the subcodes for CDs, and one for storing mode information. The subheader $S_{SH}$ is composed of 8 bytes, and includes a final number $H_1$, a channel number $H_2$, a submode $H_3$, and a coding formation $H_4$. Each of these items $H_1 - H_4$ is composed of 1 byte, and is written twice (i.e., repeated twice).

The user data $S_{UD}$ is composed of 2324 bytes in Form 2 and has data units $U_1 - U_n$ and a spare unit $U_{SP}$. In FIG. 8, each of the data units $U_1 - U_n$ is composed of 128 bytes, and the spare unit $U_{SP}$ is composed of 20 bytes. Therefore, there is a total of 18 data units in the illustrated embodiment. The voice sound and audio signals are encoded by ADPCM and recorded in these data units. The error detecting code $S_{EDC}$ is composed of 4 bytes.

Figure 9:
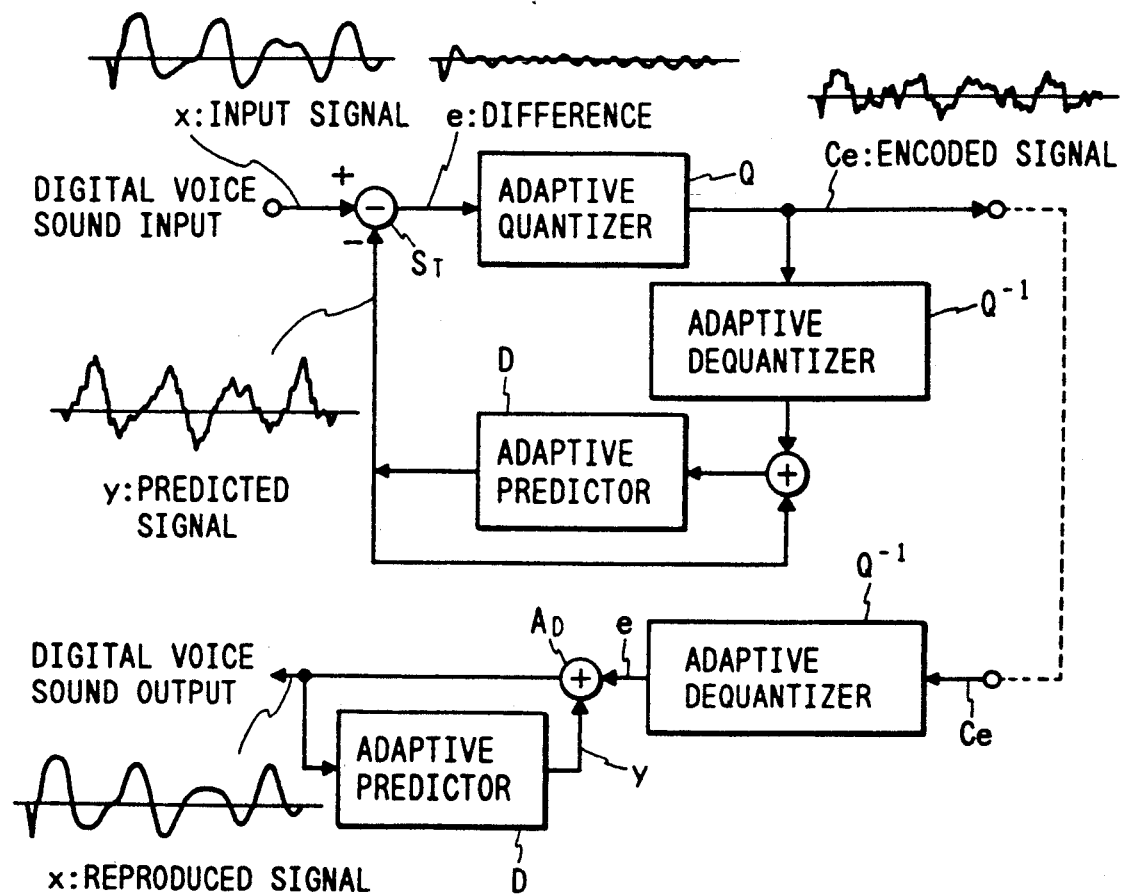
FIG. 9 is a block diagram illustrative of an ADPCM system.

FIG. 9 shows the principles of an ADPCM system. A modulation is carried out as follows. A present input signal is predicted from a past input signal by an adaptive predictor D, and the difference $e$ ($=x-y$) between the predicted signal y and a present input signal x is calculated by a subtractor $S_T$. Then, the difference $e$ is quantized with a plurality of bits and encoded into a coded signal $C_e$ by an adaptive quantizer Q. A demodulation process is carried out in a manner which is the reverse of the above mentioned process. More specifically, the coded signal $C_e$ is decoded back to the difference $e$ by an adaptive dequantizer $Q^{-1}$. Then, the predicted signal y from the adaptive predictor D and the difference $e$ are added into an output signal x by an adder $A_D$.

The ADPCM system allows audio data to be recorded efficiently with a smaller number of bits. Audio characteristics vary depending on the bit reduction ratio (data compression ratio). FIG. 10 shows the relationship between ADPCM sound quality levels and audio characteristics. It can be seen from FIG. 10 that the bit reduction ratio in the sound quality level A is ¼ for stereophonic reproduction and ¼ for monaural reproduction, the bit reduction ratio in the sound quality level B is ¼ for stereophonic reproduction and ¼ for monaural reproduction, and the bit reduction ratio in the sound quality level C is ⅛ for stereophonic reproduction and 1/16 for monaural reproduction. If the bit reduction ratio is ¼, then the required storage capacity may be ¼ of the conventional storage capacity, and the remaining ¾ storage capacity may be used to store other data.

In FIG. 8, each data unit $U_i$ is composed of 128 bytes, and has a sound parameter area $P_i$ and an ADPCM sample data area $D_i$. The sound parameter area $P_i$ has a storage capacity of 16 bytes, and stores a coefficient of a predictive filter in the adaptive predictor D shown in FIG. 9. The ADPCM sample data area $D_i$ has a storage capacity of 112 bytes and stores data sampled by the ADPCM system. Therefore, one sector has an overall data storage capacity of 2016 bytes ($=112\times18$). If data are to be stored in the ADPCM sound quality level B for stereophonic reproduction, then 504 bytes will be required to store the data because $$37.8\times10^3\times4\times2\times1/75\times\frac{1}{8}=504.$$

Therefore, since $2016\div504=4$, data which are four times greater than the data possible with the conventional storage system can be stored. Stated otherwise, voice sound and audio signals for four channels can be stored. The first channel is stored in the sectors $T_1$, $T_5$, $T_9$, ..., $T_{4h+1}$ (h is an integer of 0 or more). The second channel is stored in sectors $T_2$, $T_6$, $T_{10}$, $T_{4h+2}$. The third channel is stored in sectors $T_3$, $T_7$, $T_{11}$, ..., $T_{4h+3}$. The fourth channel is stored in sectors $T_4$, $T_8$, $T_{12}$, ..., $T_{4h+4}$.

In the data unit $U_i$ of a certain sector $T_k$, a musical accompaniment signal $b_i$ which is a digital signal representing a musical accompaniment (karaoke music), i.e., musical accompaniment information, is stored in the ADPCM sample data area $D_i$ of the data unit $U_i$. The same musical accompaniment signal as the musical accompaniment signal $b_i$ stored in the ADPCM sample data area $D_j$ of another data unit $U_j$, and a lead voice signal $g_i$ which is indicative for lead voice information are stored in the ADPCM sample data area $D_j$ of the data unit $U_j$. The lead voice signal $g_i$ is a digital signal representing a lead voice of words of a song. Thus, for example, only a musical accompaniment signal is stored in the sectors $T_1$, $T_5$, $T_9$, ... $T_{4h+1}$, which serve as a first channel, whereas both musical accompaniment and lead voice signals are stored in the sectors $T_2$, $T_6$, $T_{10}$, ..., $T_{4h+2}$, which serve as a second channel.

Ninth Embodiment

Figure 11:
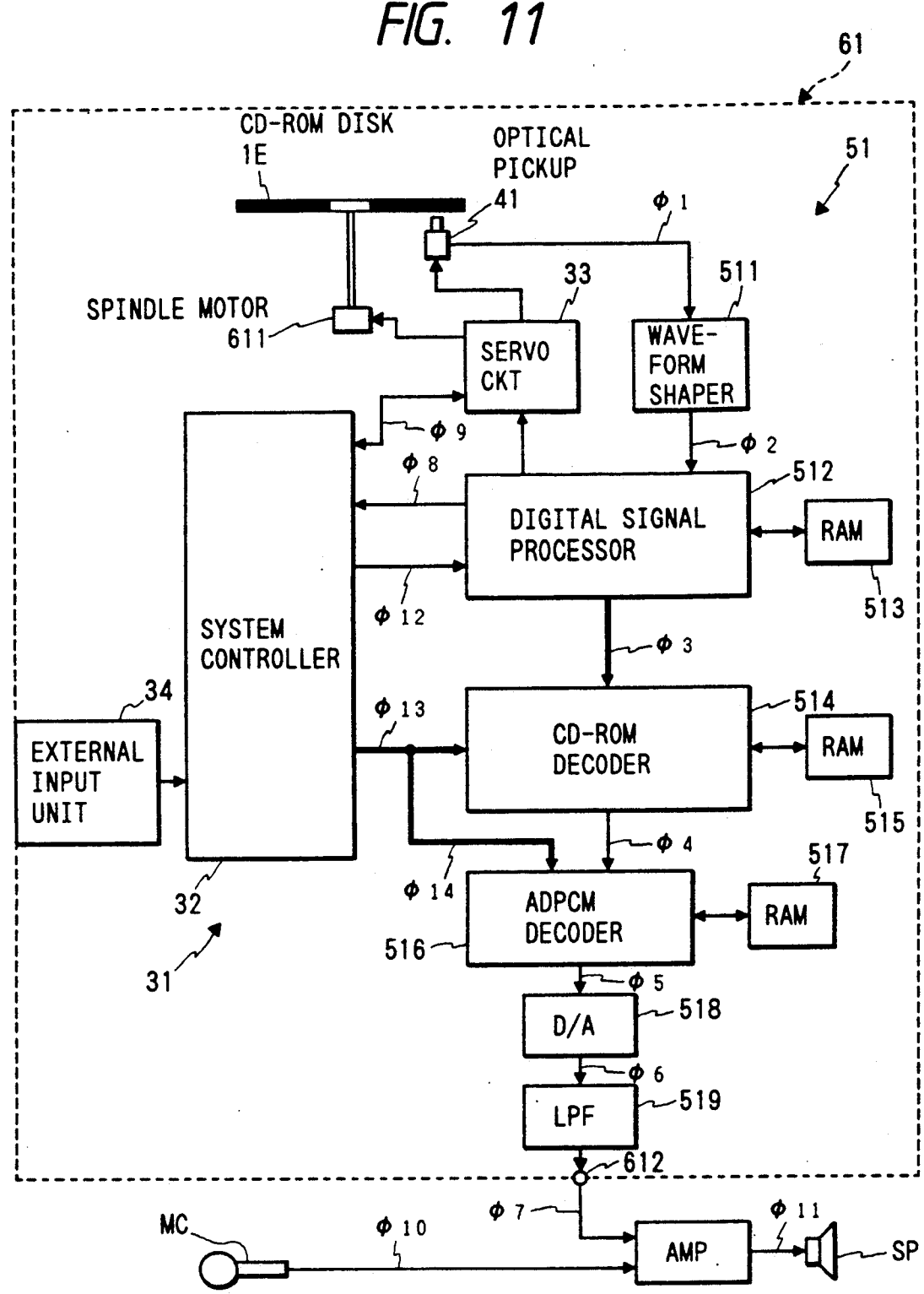
FIG. 11 is a block diagram of a karaoke or musical accompaniment playback apparatus as an apparatus for reproducing information according to a ninth embodiment of the present invention.

FIG. 11 shows a musical accompaniment playback apparatus as an information reproducing apparatus according to a ninth embodiment to the present invention.

As shown in FIG. 11, the information reproducing apparatus, generally denoted at 61, comprises an optical pickup 41 as a means for reading information, a demodulator block 51 as a means for demodulating information, a spindle motor 611, a control block 31 as a control means, and an external terminal 612.

The demodulator block 51 has a waveform shaper 511, a digital signal processor 512, a RAM (random access memory) 513, a CD-ROM decoder 514, a RAM 515, an ADPCM decoder 516, a RAM 517, a D/A converter 518, and a low-pass filter 519.

The control block 31 has a system controller 32, a servo circuit 33, and an external input unit 34.

An external amplifier AMP may be connected to the external terminal 612, and an external microphone MC and an external loudspeaker SP may be connected to the external amplifier AMP.

A CD-ROM disk 1E is rotated about its own axis by the spindle motor 61. The optical pickup 41 reads a digital signal from the recording surface of the CD-ROM disk 1E. The digital signal, designated by $\Phi_1$, read by the optical pickup 41, is supplied to the waveform shaper 511 by which the waveform of the digital signal is shaped. The shaped digital signal is then applied as a digital signal $\Phi_2$ to the digital signal processor 512. In the digital signal processor 512, the edges of an EFM signal are detected, using a reference clock signal generated by a quartz crystal oscillator, thereby reproducing a sequence of data. From the reproduced sequence of data, there is detected a frame synchronizing signal, based on which the structure of frame data is exactly reproduced. The frame data are converted into 8-bit symbol data by EFM demodulation, and written into the RAM 513. The data stored in the RAM 513 is then deinterleaved. Thereafter, an error correcting process is effected on the data. The corrected data are then sent as a signal $\Phi_3$ from the digital signal processor 512 to the CD-ROM decoder 514. In the CD-ROM decoder 514, addresses are sought according to the absolute time of the subcode, synchronizing signals in the data are detected, and the data are unscrambled. Then, the header address is checked, and a desired sector is accessed. The user data which are obtained are subjected to error detection and correction processes, after which the corrected data are supplied as a signal $\Phi_4$ to the ADPCM decoder 516.

The ADPCM decoder 516 has an adaptive dequantizer and an adaptive predictor (not shown), and demodulates the signal $\Phi_4$ into a digital signal and supplies the demodulated signal as a signal $\Phi_5$ to the D/A converter 518.

The D/A converter 518 converts the demodulated signal $\Phi_5$ into an analog signal, and sends the analog signal as a signal $\Phi_6$ to the low-pass filter 519. The low-pass filter 519 processes the signal $\Phi_6$ into an accurate signal $\Phi_7$ to the external terminal 612.

Based on a subcode signal $\Phi_8$ produced by the digital signal processor 512, the system controller 32 outputs an control signal $\Phi_9$ to control the spindle motor 611 and the servo circuit 33 for the optical pickup 41.

The analog signal $\Phi_7$, which is an audio output signal from the musical accompaniment playback apparatus 61, is applied to the external amplifier AMP. Voice sounds applied to the external microphone MC are converted thereby into a microphone voice signal $\Phi_{10}$ which is then applied to the external amplifier AMP. The external amplifier AMP adjusts the frequency characteristics of the analog signal $\Phi_7$ and also mixes the analog signal $\Phi_7$ with the microphone voice signal $\Phi_{10}$. Then, the external amplifier AMP amplifies the mixed signal to a suitable level, and then sends the amplified signal $\Phi_{11}$ to the external loudspeaker SP. The external loudspeaker SP converts the signal $\Phi_{11}$ into audible sounds which are radiated from the external loudspeaker SP. The system controller 32 controls the digital signal processor 512, the CD-ROM decoder 514, and the ADPCM decoder 516 with control signals $\Phi_{12}$–$\Phi_{14}$ according to a control signal inputted from the external input unit 34 or a built-in program.

Operation of the musical accompaniment playback apparatus 61 as the ninth embodiment which is loaded with the CD-ROM disk 1E as the eighth embodiment will now be described below with reference to FIGS. 8 and 11.

The spindle motor 611 is energized to rotate the CD-ROM disc 1E about its own axis according to a control signal inputted from the external input unit 34. The optical pickup 41 reads a digital signal from the storage area 2E of the data sectors of the CD-ROM disk 1E.

As shown in FIG. 8, the data unit $U_j$ of the sector $T_j$ stores a musical accompaniment signal $b_i$, which is a digital signal representing a musical accompaniment, and a lead voice signal $g_i$, which is a digital signal representing pronunciation of words of a song that is &0 be sung to the musical accompaniment. When only the musical accompaniment is to be reproduced, the musical accompaniment signal $b_i$ stored in the ADPCM sample data area $D_i$ of the data unit $U_i$ is reproduced. If a control command to reproduce the musical accompaniment and the lead voice, from the external input unit 34, then the system controller 32 generates a control signal to reproduce the musical accompaniment signal $b_i$ stored in the ADPCM sample data area $D_j$ of the data unit $U_j$ and also the lead voice signal $g_1$ which is a vocal representation of the words of the song to be sung immediately thereafter. Therefore, the user of the musical accompaniment playback apparatus 61 is able to know the words of the song to be sung according to the lead voice, and can accurately sing the word of the song to the musical accompaniment. The musical accompaniment playback apparatus shown in FIG. 11 is thus capable of playing back musical accompaniments with lead voices, and the user can switch between ordinary reproduction of musical accompaniments and that of musical accompaniments with lead voices.

Tenth Embodiment

FIGS. 12(A) through 12(D) show a compact cassette tape as an information storage medium according to a tenth embodiment of the present invention.

Figure 12A:
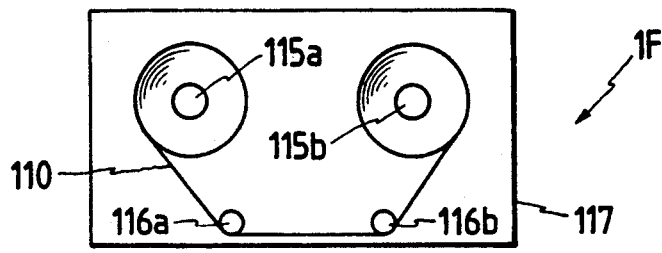
FIGS. 12(A) through 12(D) are diagrams showing a compact cassette tape as an information storage medium according to a tenth embodiment of the present invention.

The compact cassette tape, generally denoted at 1F in FIG. 12(A), comprises a magnetic tape 110, a pair of hubs 115a, 115b, a pair of guide trollers 116a, 116b, and a cassette half 117.

Figure 12B:
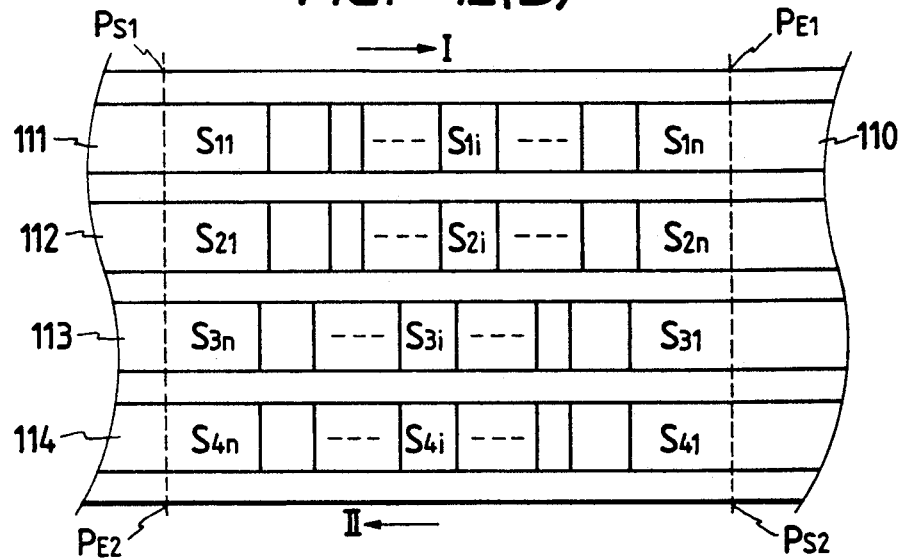

As shown in FIG. 12(B), the magnetic tape 110 has recording tracks 111, 112, 113, 114 as storage areas. The recording track 111 is storage area for recording a left (L) channel of information on side A (i.e., in a playback direction I), and the recording track 112 is a storage area for recording a right (R) channel of information on side A.

The recording track 113 is a storage area for recording a right (R) channel of information on side B (i.e., in a playback direction II), and the recording track 114 is a storage area for recording a left (L) channel of information on side B.

The recording track 111 has a plurality of sections $S_{11}$–$S_{1n}$ arranged in the playback direction I from a reproduction starting point $P_{S1}$ to a reproduction ending point $P_{E1}$. Likewise, the recording track 112 has plurality of sections $S_{21}$–$S_{2n}$. Of the sections $S_{11}$–$S_{1n}$, the section $S_{1i}$, for example, stores a musical accompaniment piece signal $b_{iL}$ for the L channel which is a magnetic signal representative of a musical accompaniment piece. Of the sections $S_{21}$–$S_{2n}$, the section $S_{2i}$, for example, stores a musical accompaniment piece signal $b_{iR}$ for the R channel which is a magnetic signal representative of a musical accompaniment piece. In this manner, musical accompaniments are stored in the form of a musical accompaniment piece signals $b_{1L}$–$b_{nL}$, $b_{1R}$–$b_{nR}$.

Figure 12C:
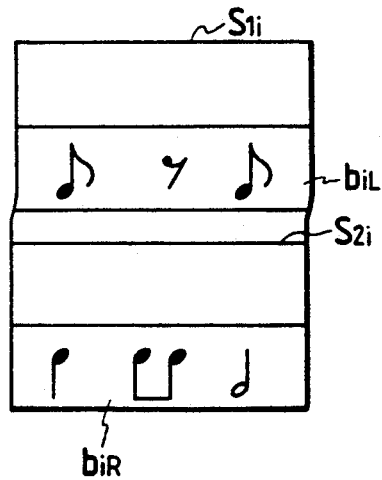

The recording tracks 113, 114 on side B store the same musical accompaniment information pieces as that which is stored in the recording tracks 111, 112. The reproduction ending point $P_{E1}$ on side A is transversely aligned with a reproduction starting point $P_{S2}$ on side B, and the reproduction starting point $P_{S1}$ on side A is transversely aligned with a reproduction ending point $P_{E2}$ on side B. The recording track 113 has a plurality of sections $S_{31}$–$S_{3n}$ arranged in a playback direction II from the reproduction starting point $P_{S2}$ to the reproduction ending point $P_{E2}$. Likewise, the recording track 114 has a plurality of sections $S_{41}$–$S_{4n}$. The sections $S_{1i}$, $S_{4i}$ or $S_{2i}$, $S_{3i}$ store information in timed relationship. For example, the section $S_{4i}$ stores a musical accompaniment piece signal $b_{iL}$ and a lead voice piece signal $g_i$ which is a magnetic signal that is a lead voice piece representation of words of a song as lead voice information, as shown in FIG. 12(C). The musical accompaniment piece signal $b_{iL}$ in the section $S_{4i}$ is the same as the musical accompaniment piece signal in the section $S_{1i}$.

Figure 12D:
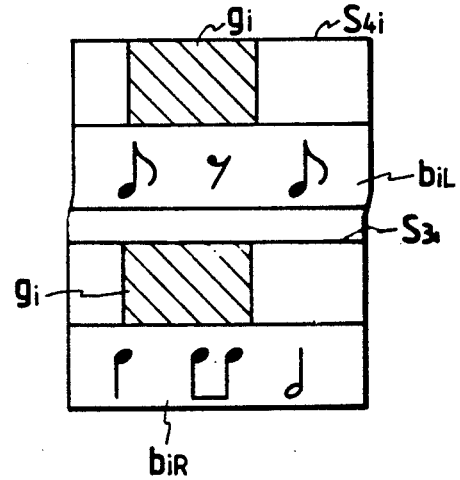

As shown in FIG. 12(D), the section $S_{3i}$ stores a musical accompaniment piece signal $b_{iR}$ and a lead voice piece signal $g_i$. The musical accompaniment piece signal $b_{iR}$ in the section $S_{3i}$ is the same as the musical accompaniment piece signal in the section $S_{2i}$, and the lead voice piece signal $g_i$ in the section $S_{3i}$ is the same as the lead voice piece signal in the section $S_{4i}$.

The compact cassette tape 1F is loaded in a tape deck or a similar information reproducing apparatus which is arranged such that when the reading place for the magnetic tape 110 reaches the point $P_{E1}$, the direction of travel of the magnetic tape 110 can be reversed, and the magnetic signal can be read from the point $P_{S2}$, or when the reading place for the magnetic tape 110 reaches the point $P_{E2}$, the direction of travel of the magnetic tape 110 can be reversed, and the magnetic signal can be read from the point $P_{S1}$. When the compact cassette tape 1F is played back by such a tape deck or the like, ordinary musical accompaniments and musical accompaniments with lead voices can selectively be reproduced alternately or endlessly.

Eleventh Embodiment

Figure 13:
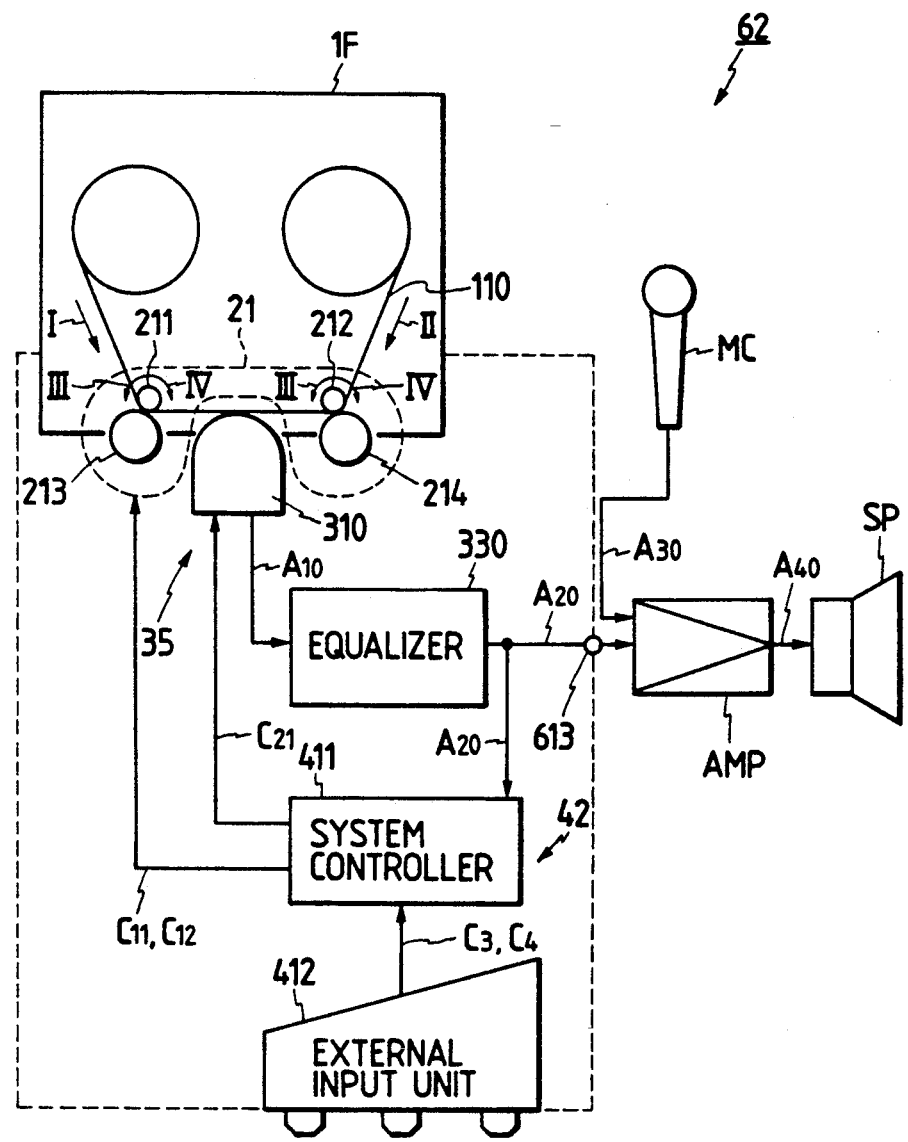
FIG. 13 is a block diagram of a karaoke or musical accompaniment playback apparatus as an apparatus for reproducing information according to an eleventh embodiment of the present invention.

FIG. 13 shows a magnetic recording/reproducing apparatus which is used as a musical accompaniment playback apparatus as an apparatus for reproducing information according to an eleventh embodiment of the present invention.

As shown in FIG. 13, the musical accompaniment playback apparatus, generally indicated at 62, comprises a tape driving block 2i as a tape driving means, a reading block 35 as a magnetic signal reading means, a control block 42 as a control means, and an external terminal 613.

Figure 14:
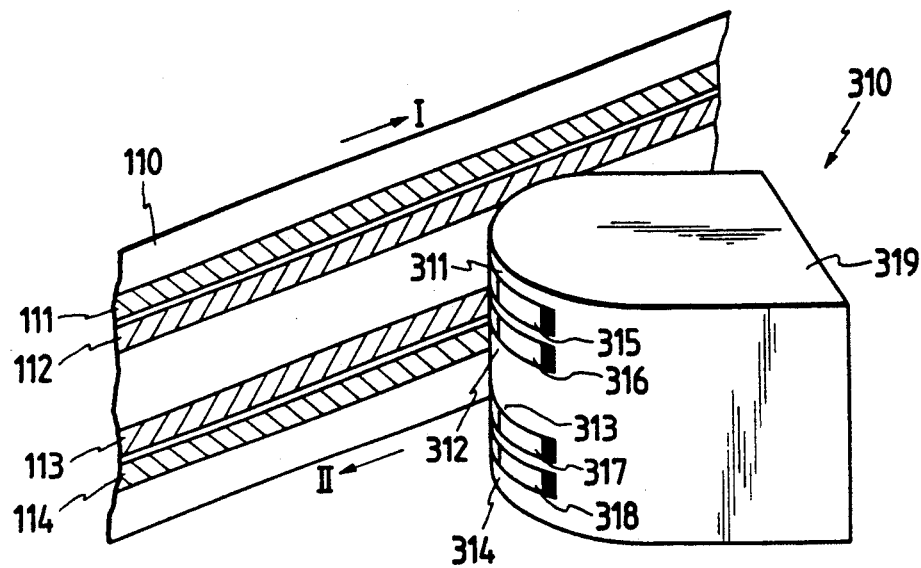
FIG. 14 is a perspective view of a magnetic head and a magnetic tape with recording tracks, in the musical accompaniment playback apparatus shown in FIG. 13.

The reading block 35 has a magnetic head 3i0 and an equalizer 330. As illustrated in FIG. 14, the magnetic head 310 has gaps 311, 312, 313. 314, cores 315, 316, 317, 318, and a shield case 319. The gaps 311, 312, 313, 314 correspond in position to the recording tracks 111, 112, 113, 114, respectively, of the magnetic tape 110 shown in FIG. 12(B).

The tape driving block 21 has capstans 211, 212, and pinch rollers 213, 214.

The control block 42 has a system controller 411 and an external input unit 412.

An external amplifier AMP may be connected to the external terminal 613, and an external microphone MC and an external amplifier AMP.

Operation of the musical accompaniment playback apparatus 62 with the compact cassette tape 1F will be described below with reference to FIGS. 12(A) through 12(D], 13, and 14.

The magnetic tape 110 of the compact cassette tape 1F is gripped between the capstan 211 and the pinch roller 213 and also between the capstan 212 and the pinch roller 214. The capstans 211, 212 are rotated about their own axes in the direction indicated by the arrow III to transport the magnetic tape 110 in the direction indicated by the arrow I. The magnetic head 310 now reads a magnetic signal from side a of the magnetic tape 110. If the capstans 211, 212 are rotated in the direction indicated by the arrow IV, the magnetic tape 111 runs in the direction indicated by the arrow II, and the magnetic head 310 reads a magnetic signal from side B of the magnetic tape 110.

The readout signal, denoted at $A_{10}$, read by the magnetic head 310 is inputted to the equalizer 330. The equalizer 330 processes the readout signal $A_{10}$ so as to match with predetermined equalization characteristics, and applies an equalized audio output signal $A_{20}$ to the external terminal 613 and the system controller 411. The external amplifier AMP amplifies the output signal $A_{20}$ to a suitable level, and mixes the same with a voice sound signal $A_{30}$ from the external microphone MC. The mixed signal is applied as a signal $A_{40}$ to the external loudspeaker SP, which then produces and radiates voice sounds represented by the signal $A_{40}$. The system controller 411 controls various components of the musical accompaniment playback apparatus 62 according to a control input signal from the external input unit 412 or a built-in program.

Now, operation of the musical accompaniment playback apparatus 62 which is loaded with the compact cassette tape 1F will be described in greater detail with reference to FIGS. 12(A) through 12(D), 13, 14, 15, and 16.

When a control command signal $C_3$ to rotate the capstans 211, 212 in the direction indicated by the arrow IV is inputted from the external input unit 412, the control command signal $C_3$ is transmitted as a control signal $C_{11}$ from the system controller 411 to the capstans 211, 212. In response to the control signal $C_{11}$, the capstans 211, 212 rotate in the direction indicated by the arrow IV to transport the magnetic tape 110 in the direction indicated by the arrow II in FIGS. 12(B) and 13. The magnetic head 310 then reads the magnetic signal from side B of the magnetic tape 110. At this time, as shown in FIG. 14, the gap 313 of the magnetic head 310 reads the recording track 113 and the gap 314 reads the recording track 114 in the direction II.

Since the information is recorded on side B as shown in FIG. 12(B), the recorded information starts being reproduced from the point $P_{S2}$. From the sections $S_{3i}$, $S_{4i}$, the musical accompaniment piece signals $b_{iL}$, $b_{iR}$ and the lead voice piece signal $g_i$ which is a vocal representation of words of a certain phrase of a song are reproduced into a musical accompaniment piece or musical accompaniment information piece and a lead voice piece or lead voice information piece. The user of the musical accompaniment playback apparatus 62 is now able to know the words of the song to be sung, according to the lead voice, immediately before singing the words of the song. The user can thus accurately sing the words of the song even without song book, displayed subtitles, or other information for assisting. In this manner, the recording tracks 113, 114 are played back until the reproduction ending point $P_{E2}$ is reached. When the reproduction ending point $P_{E2}$ is reached, a control command signal $C_4$ to reverse the capstans 211, 212 in the direction indicated by the arrow II is inputted from the external input unit 412, or according to a built-in program in the system controller 411, or in response to detection of an intermusic soundless signal from the signal $A_{20}$. The control command signal $C_4$ is transmitted as a control signal $C_{12}$ from the system controller 411 to the capstans 211, 212, which then cause the magnetic tape 110 to run in the direction I as shown in FIGS. 12(B) and 13. Therefore, the magnetic head 310 starts to read the magnetic signal from side A of the magnetic tape 110 from the point $P_{S1}$ to the point $P_{E1}$. At this time, the system controller 411 applies a control signal $C_{21}$ to the magnetic head 310 to enable the gaps 311, 312, to read the recording tracks 111, 112 in the direction I. As shown in FIG. 12(C), no lead voice piece signal is recorded on side A, but only a musical accompaniment piece signal is recorded on side A. Consequently, the user can reproduce ordinary musical accompaniments from the magnetic tape 110.

The above reproducing process is shown in FIG. 15. More specifically, the information stored in the compact cassette tape 1F is reproduced by the musical accompaniment playback apparatus 62 in the sequence from $P_{S2}$ to $P_{E2}$ to $P_{S1}$ to $P_{E1}$ or from $P_{S1}$ to $P_{E1}$ to $P_{S2}$ to $P_{E2}$.

By repeating the above process, the user can reproduce musical accompaniments with lead voices and ordinary musical accompaniment selectively or endlessly or repeatedly from one side (e.g., side A).

Figure 16:
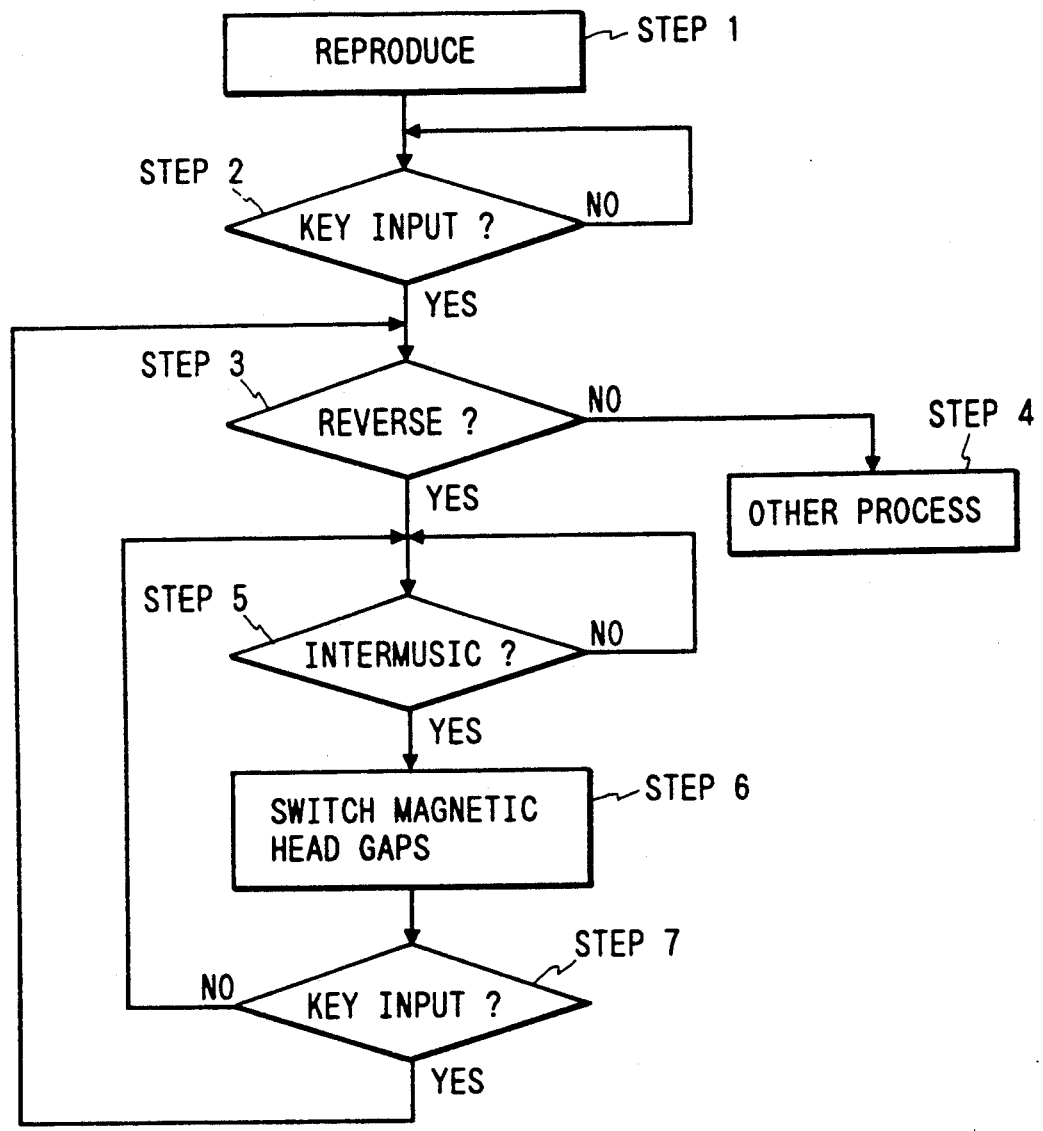
FIG. 16 is a flowchart of an operation sequence of the musical accompaniment playback apparatus shown in FIG. 13.

FIG. 16 shows, by way of example, a control program to be executed by the system controller 411. After the control sequence is started in a step 1, a step 2 determines whether an input signal is applied to the external input unit 412 in response to a key depression. If not, then control returns to the step 2, and if an input signal is applied, then control goes to a step 3 which determines the input signal is a reverse control command or not. If the input signal is not a reverse control command, then control goes to a step 4 for another processing sequence. If the input signal is a reverse control command then control proceeds to a step 5 which determines whether a music piece is being reproduced or an intermusic region on the magnetic tape is reached. If an intermusic region is reached, then control goes to a step 6 in which the magnetic head 3i0 switches from recording tracks to other recording tracks. Then, control proceeds from the step 6 to a step 7 which determines an input signal is applied by a key stroke or not. If an input signal is not applied by a key stroke, then the reproduction process is continued, and control goes back to the step 5. If an input signal is applied by a key stroke, then the step 3 is repeated.

Twelfth Embodiment

FIGS. 17(A) through 17(D) show a compact cassette tape as an information storage medium according to a twelfth embodiment of the present invention.

Figure 17A:
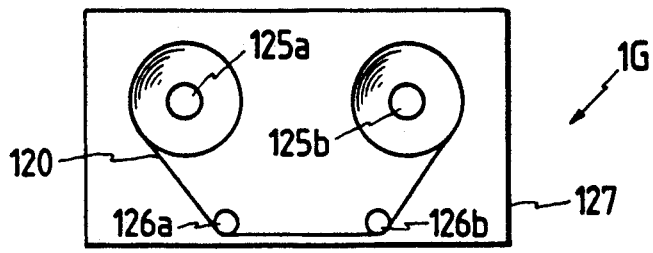
FIGS. 17(A) through 17(D) are diagrams showing a compact cassette tape as an information storage medium according to a twelfth embodiment of the present invention, respectively.

The compact cassette tape, generally denoted at 1G in FIG. 17(A), comprises a magnetic tape 120, a pair of hubs 125a, 125b, a pair of guide rollers 126a, 126b, and a cassette half 127.

Figure 17B:
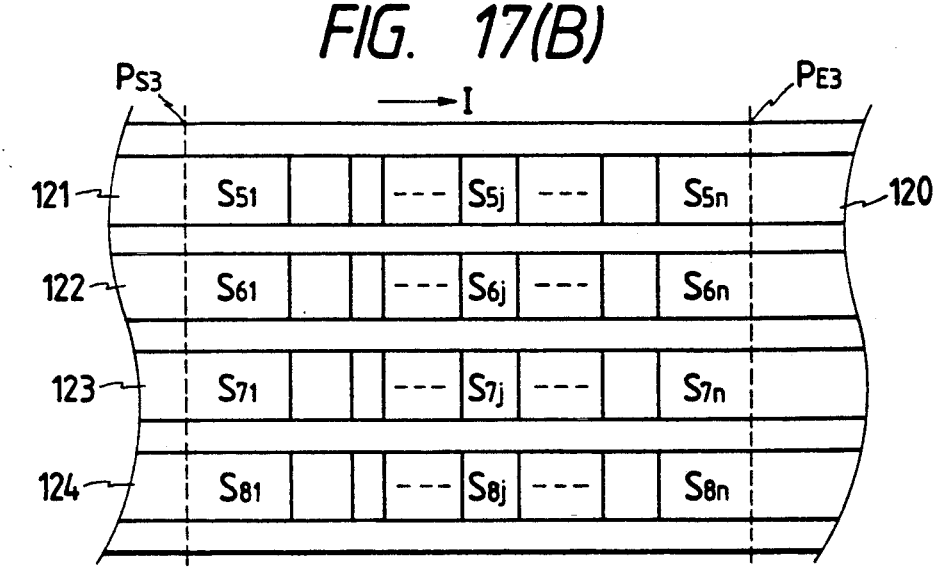
Figure 17C:
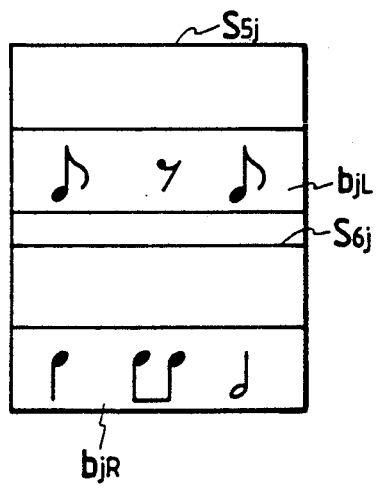

As shown in FIG. 17(B), the magnetic tape 120 has recording tracks 121, 122, 123, 124 as storage areas. The recording track 121 is storage area for recording a left (L) channel of information on side A (i.e., in a playback direction I), and the recording track 122 is a storage area for recording a right (R) channel of information on side A.

The recording track 123 is a storage area for recording a left (L) channel of information on side B (i.e., in the playback direction I), and the recording track 124 is a storage area for recording a right (R) channel of information on side B.

The recording track 121 has a plurality of sections $S_{51}$–$S_{5n}$ arranged in the playback direction I from a reproduction starting point $P_{S3}$ to a reproduction ending point $P_{E3}$. Likewise, the recording track 122 has a plurality of sections $S_{61}$–$S_{6n}$. Of the sections $S_{51}$–$S_{5n}$, the section $S_{5j}$, for example stores a musical accompaniment piece signal $b_{jL}$ for the L channel which is a magnetic signal representative of a musical accompaniment piece. Of the sections $S_{61}$–$S_{6n}$, the section $S_{6j}$, for example, stores a musical accompaniment piece signal $b_{jR}$ for the R channel which is a magnetic signal representative of a musical accompaniment piece. In this manner, musical accompaniments are stored in the form of musical accompaniment piece signals $b_{1L}$–$b_{nL}$, $b_{1R}$–$b_{nR}$.

The recording tracks 123, 124 on side B store the some musical accompaniment information pieces as that which is stored in the recording tracks 121, 122. The reproduction starting point $P_{E3}$ on side A is transversely aligned with a reproduction starting point $P_{E3}$ on side B, and the reproduction ending point $P_{E3}$ on side A is transversely aligned with a reproduction ending point $P_{E3}$ on side B. The recording track 123 has a plurality of sections $S_{71}$–$S_{7n}$ arranged in the playback direction I from the reproduction starting point $P_{S3}$ to the reproduction ending point $P_{E3}$. Likewise, the recording track 124 has a plurality of sections $S_{81}$–$S_{8n}$. The sections $S_{5j}$, $S_{7j}$ or $S_{6j}$, $S_{8j}$ store information in timed relationship. For example, the section $S_{7j}$ stores a musical accompaniment piece signal $b_{jL}$, in the section $S_{7j}$ is the same as the musical accompaniment piece signal in the section $S_{5j}$.

Figure 17D:
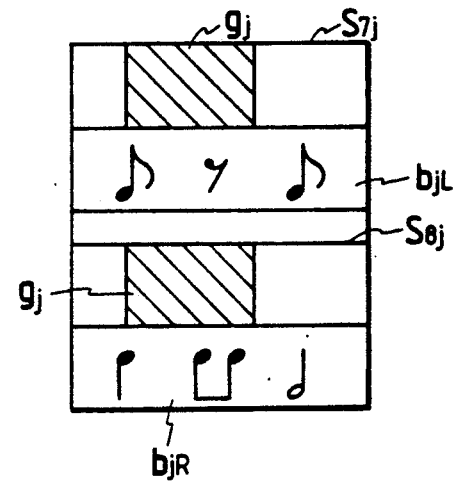

As shown in FIG. 17(D), the section $S_{8j}$ stores a musical accompaniment piece signal $b_{jR}$ and a lead voice piece signal $g_j$. The musical accompaniment piece signal $b_{jR}$ in the section $S_{8j}$ is the same as the musical accompaniment signal in the section $S_{6j}$, and the lead voice piece signal $g_j$ in the section $S_{8j}$ is the same as the lead voice piece signal in the section $S_{6j}$.

The compact cassette tape 1G is loaded in a tape deck or a similar information reproducing apparatus which is capable of starting to play back the recording track 123, 124 while the recording track 121, 122 are being played back, from the point corresponding to which the recording track 121, 122 has been played back, or of starting to play back the recording track 121, 122 while the recording track 123, 124 are being played back, from the point corresponding to which the recording track 123, 124 has been played back. When the compact cassette tape 1G is played back by such a tape deck or the like, ordinary musical accompaniments and musical accompaniments with lead voices can selectively be reproduced.

Thirteenth Embodiment

FIG. 18 shows a magnetic recording/reproducing apparatus which is used as a musical accompaniment playback apparatus as an apparatus for reproducing information according to a thirteenth embodiment of the present invention.

Figure 19:
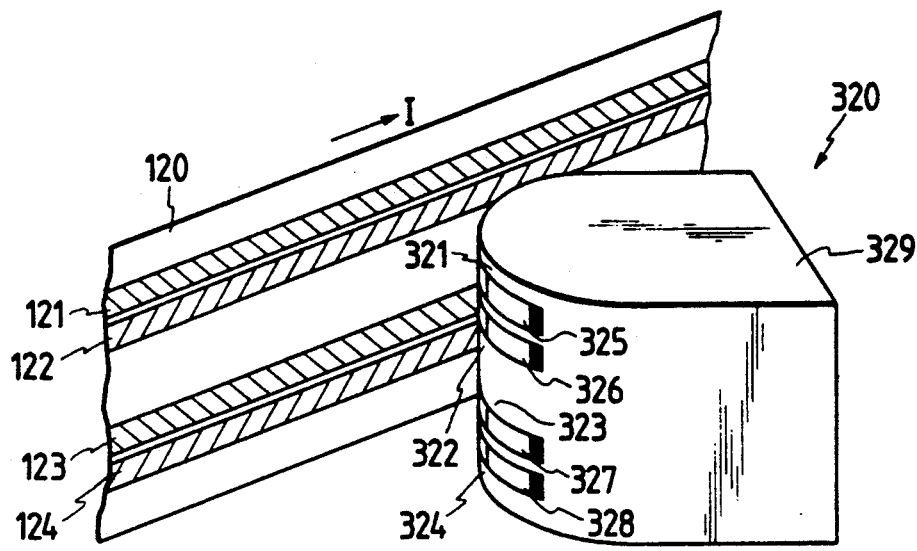
FIG. 19 is a perspective view of a magnetic head and a magnetic tape with recording tracks, in the musical accompaniment playback apparatus shown in FIG. 18.

As shown in FIG. 18, the musical accompaniment playback apparatus, generally indicated at 63, comprises a tape driving block 22 as a tape driving means, a reading block 36 as a magnetic signal reading means, a control block 43 as a control means, and an external terminal 614. The reading block 36 has a magnetic head 320 and an equalizer 340. As illustrated in FIG. 19, the magnetic head 320 has gaps 321, 322, 323, 324, cores 325, 326, 327, 328, and a shield case 329. The gaps 321, 322, 323, 324 correspond in position to the recording tracks 121, 122, 123, 123, respectively, of the magnetic tape 120 shown in FIG. 17(B).

The tape driving block 22 has capstans 221, 222, and pinch rollers 223, 224.

The control block 43 has m system controller 421 and an external input unit 422.

An external amplifier AMP may be connected to the external terminal 614, and an external microphone MC and an external loudspeaker SP may be connected to the external amplifier AMP. General operation of the musical accompaniment playback apparatus 63 is the same as that of the musical accompaniment playback apparatus 62 shown in FIG. 13.

Now, operation of the musical accompaniment playback apparatus 63 which is loaded with the compact cassette tape 1G will be described in greater detail with reference to FIGS. 17(A) through 17(D), 18, 19, and 20.

When a control command signal $C_5$ to rotate the capstans 221, 222 in the direction indicated by the arrow III is inputted from the external input unit 422, the control command signal $C_5$ is transmitted as a control signal $C_{13}$ from the system controller 421 to the capstans 221, 222. In response to the control signal $C_{13}$, the capstans 221, 222 rotate in the direction indicated by the arrow III to transport the magnetic tape 120 in the direction indicated by the arrow I in FIGS. 17(B) and 18. The magnetic head 320 then reads the magnetic signal from side A of the magnetic tape 120. At this time, as shown in FIG. 19, the gap 321 of the magnetic head 320 reads the recording track 121 and the gap 322 reads the recording track 122 in the direction I.

Since the information is recorded on side A as shown in FIG. 17(B), the recorded information starts being reproduced from the point $P_{S3}$. From the section $S_{5j}$, $S_{6j}$, only the musical accompaniment piece signals $b_{jL}$, $b_{jR}$ are reproduced into a musical accompaniment piece. At this time, a control command signal $C_6$ is supplied to the magnetic head 320 from the external input unit 422 or according to a built-in program in the system controller 421, thereby switching from the gaps 321, 322 to 323, 324 for reading information. From this time on, the magnetic head 320 reads the recording tracks 123, 124. Inasmuch as the sections $S_{7j}$, $S_{8j}$ store the musical accompaniment piece signals $b_{jL}$, $b_{jR}$ and lead voice piece signals $g_i$ which are a vocal representation of words of phrases of songs, the musical accompaniment playback apparatus 63 reproduces a musical accompaniment, which is represented by musical accompaniment information, and a lead voice, which is represented by lead voice information. Therefore, the user of the musical accompaniment playback apparatus 63 is now able to know the words of the song to be sung, according to the lead voice, immediately before singing the words of the song. The user can thus accurately sing the words of the song even without a song book, displayed subtitles, or other information for assisting. In this manner, it is possible to switch from a musical accompaniment, while it is being reproduced, to the same musical accompaniment with a lead voice in timed relationship. Conversely, it is also possible to switch from a musical accompaniment with a lead voice, while it is being reproduced, to the same musical accompaniment without the lead voice. Furthermore, a musical accompaniment with or without a lead voice can repeatedly be reproduced.

FIG. 20 shows the above reproducing process. More specifically, the musical accompaniment playback apparatus 63 reproduces an ordinary musical accompaniment from the recording tracks 121, 122 of the compact cassette tape 1G from a point $P_{30}$ to a point $P_{31}$, then a musical accompaniment with a lead voice from the recording tracks 123, 124 from a point $P_{32}$ to a point $P_{33}$, and thereafter an ordinary musical accompaniment from the recording tracks 121, 122 of the compact cassette tape 1G from a point $P_{34}$ to a point $P_{35}$.

In the above embodiments, the musical accompaniment information represents musical accompaniment, and the lead voice information represents the words of songs. However, the musical accompaniment information may be representative of background sounds, and the lead voice information may represent the dialogues of dramas, the reading of literature, the reading of Scriptures, or a combination thereof. For example, the lead voice information may represent the word of folk songs, musicals, operas, and operettas, the dialogues of dramas and movies, Buddhist scriptures, and the other religious scriptures.

While the lead voice information is indicative of the words of songs for musical accompaniments in the above embodiments, it may be guide vocals which are sung ahead of phrases, notes indicating times to start singing songs, the tempo of songs, the strength of the voice to be uttered, remarks to be followed in the singing of songs, or combination thereof.

If the lead voice information indicates lead voices for the words of song, then it may contain a plurality of lead voices for songs to be sung by a plurality of persons, such as duets to be sung by male and female singers. In this case, a plurality of lead voice signals may be included in lead voice signals $b_i$ which are identical for L and R channels. For example, a lead voice signal for the male part may be recorded in the L channel, and a lead voice signal for the female part may be recorded in the R channel.

The words of songs that are recorded may be other languages than Japanese, such as English, German, French, Chinese, Korean, Spanish, Italian, Portuguese, Russian, or the like.

The digital audio information storage medium may be an ordinary CD, a DAT (digital audio tape) an IC card, or any of various ROMs. If the digital audio information storage medium is a CD-ROM, it may be in the form of a CD-I or the like.

The magnetic recording tape may be 8-track tape, an open-reel tape, a microcassette tape, or the like other than the compact cassette tape.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information storage medium comprising first storing means for storing musical accompaniment information and second storing means for storing lead voice information including word-of-song information to be reproduced in relation to said musical accompaniment information being pronounced, said lead voice information being stored in a first position which precedes, with respect to time of reproduction, a second position from which said word-to-song information is to be reproduced.

2. An information storage medium according to claim 1, wherein said second storing means comprises means for storing a plurality of word-of-song information pieces, said pieces being representative of word-of-song information which are discrete in time, and means for storing a plurality of lead voice information pieces which correspond respectively to said word-to-song information pieces, said lead voice information pieces being stored in respective positions which precede, with respect to time of reproduction, positions from which the corresponding word-of-song information pieces are to be reproduced.

3. An information storage medium according to claim 1, wherein said information storage is medium an optical disk according to Adaptive Differential Pulse Code Modulation system.

4. An apparatus for reproducing digital information comprising a storage area which stores audio information that is pulse-code-modulated; and means, coupled to said storage areas, for reproducing information stored in said storage area, said storage area being divided into a plurality of sections, at least one of said sections storing a plurality of musical accompaniment information pieces and a corresponding plurality of lead voice information pieces in which a respective plurality of word-of-song information pieces to be reproduced in relation to said musical accompaniment information pieces is respectively pronounced, each of said lead voice information pieces being respectively stored in a position which precedes, with respect to time of reproduction, a respective position from which each of said word-of-song information pieces is to be reproduced.

5. An apparatus for reproducing digital information according to claim 4, wherein said digital information storage medium is an optical disk according to Adaptive Differential Pulse Code Modulation system.

6. An apparatus for reproducing digital information comprising a storage area which stores audio information that is pulse-code-modulated; and means, coupled to said storage area, for reproducing information stored in said storage area, said storage area being divided into a plurality of sections, said sections including a first group and a second group, each section of said first group storing a plurality of musical accompaniment information pieces and a plurality of corresponding lead voice information pieces in which a plurality of respective word-of-song information pieces to be reproduced in relation to each of said musical accompaniment information pieces is pronounced, each of said lead voice information pieces being respectively stored in a position which precedes, with respect to time of reproduction, a corresponding position from which each of said respective word-of-song information pieces is to be reproduced, each section of said second group storing only said each of said musical accompaniment information pieces.

7. An apparatus for reproducing digital information according to claim 6, wherein said information storage medium is an optical disk according to Adaptive Differential Pulse Code Modulation system.

8. An apparatus for reproducing information from a digital information storage medium including a storage area which stores audio information that is pulse-code-modulated, said storage area being divided into a plurality of sections, at least one of said sections storing a plurality of musical accompaniment information pieces and a corresponding plurality of lead voice information pieces in which a respective plurality of word-of-song information pieces to be reproduced in relation to said musical accompaniment information pieces is respectively pronounced, each of said lead voice information pieces being respectively stored in a position which precedes, with respect to time of reproduction, a respective position from which each of said word-of-song information pieces is to be reproduced, said apparatus comprising:

information reading means for reading information from said information storage medium;

information demodulating means for demodulating said information read by said information reading means and generating said demodulated information; and control means for controlling said information reading means to selectively read the information stored in said plurality of sections including the section which stores said musical accompaniment information pieces and said lead voice information pieces.

9. An apparatus for reproducing information from a digital information storage medium including a storage area which stores audio information that is pulse-code-modulated, said storage area being divided into a plurality of sections, said sections including a first group and a second group, each section of said first group storing a plurality of musical accompaniment information pieces and a plurality of corresponding lead voice information pieces in which a plurality of respective word-of-song information pieces to be reproduced in relation to each of said musical accompaniment information pieces is pronounced each of said lead voice information pieces being respectively stored in a position which precedes, with respect to time of reproduction, a corresponding position from which each of said respective word-of-song information pieces is to be reproduced, each section of said second group storing only said each of said musical accompaniment information pieces, said apparatus comprising:

information reading means for reading information from said information storage medium;

information demodulating means for demodulating said information read by said information reading means and generating said demodulated information; and control means for controlling said information reading means to selectively read the information from said first group which stores said musical accompaniment information pieces and said lead voice information pieces, and said second group which stores said musical accompaniment pieces only.

10. An apparatus according to claim 9, further comprising:

command input means for providing a command for selecting one of reproduction of said first group and reproduction of said second group;

acoustoelectric transducer means for transducing voice sound sung in relation to said musical accompaniment information into electric voice information; and information mixing means for mixing said musical accompaniment information with said electric voice information.

11. A magnetic recording tape comprising at least first and second recording tracks, at least one of said first and second recording tracks storing only musical accompaniment information, the other of said first and second recording tracks storing musical accompaniment information and lead voice information in which word-to-song information to be reproduced in relation to said musical accompaniment information is pronounced, said lead voice information being stored in a first position which precedes, with respect to time of reproduction, a second position from which word-of-song information is to be reproduced, said at least one recording track having a reproduction starting point aligned with a reproduction ending point on said other recording track; said at least one recording track having a reproduction ending point aligned with a reproduction starting point on said other recording track.

12. An apparatus for reproducing recorded information from a magnetic recording tape comprising at least two recording tracks, at least one of said recording tracks storing only musical accompaniment information, the other of said recording tracks storing musical accompaniment information and lead voice information in which word-of-song information to be reproduced in relation to said musical accompaniment information is pronounced, said lead voice information being stored in a first position which precedes, with respect to time of reproduction, a second position from which said word-of-song information is to be reproduced, said at least one recording track having a reproduction starting point aligned with a reproduction ending point on said other recording track, said at least one recording track having a reproduction ending point aligned with a reproduction starting point on said other recording track, said apparatus comprising:

tape driving means for transporting said magnetic recording tape;

magnetic signal reading means for reading a magnetic signal from said magnetic recording tape at a predetermined reading place while said magnetic recording tape is being transported by said tape driving means, and producing an electric signal representing said magnetic signal; and control means for starting to reproduce the information from said other recording track from said reproduction starting point thereon when the reproduction ending point on said one recording track reaches said predetermined reading place, and for starting to reproduce the information from said one recording track from said reproduction starting point thereon when the reproduction ending point on said other recording track is reached to said predetermined reading place.

13. An apparatus according to claim 12, further comprising;

acoustoelectric transducer means for transducing voice sound sung in relation to said musical accompaniment information into electric voice information; and information mixing means for mixing said musical accompaniment information with said electric voice information.

14. A magnetic recording tape comprising at least first and second recording tracks, at least one of said recording first and second tracks storing only musical accompaniment information, the other of said first and second recording tracks storing musical accompaniment information and lead voice information in which word-to-song information to be reproduced in relation to said musical accompaniment information is pronounced, said lead voice information being stored in a first position which precedes, with respect to time of reproduction, a second position from which word-of-song information is to be reproduced, said at least one recording track having a reproduction starting point aligned with a reproduction ending point on said other recording track; said at least one recording track having a reproduction ending point aligned with a reproduction ending point on said other recording track.

15. An apparatus for reproducing recorded information from a magnetic recording tape comprising at least two recording tracks, at least one of said recording tracks storing only musical accompaniment information, the other of said recording tracks storing musical accompaniment information and lead voice information in which word-of-song information to be reproduced in relation to said musical accompaniment information is pronounced, said lead voice information being stored in a first position which precedes, with respect to time of reproduction, a second position from which said word-of-song information is to be reproduced, said at least one recording track having a reproduction starting point aligned with a reproduction starting point on said other recording track, said at least one recording track having a reproduction ending point aligned with a reproduction ending point on said other recording track, said apparatus comprising:

tape driving means for transporting said magnetic recording tape;

magnetic signal reading means for reading a magnetic signal from said magnetic recording tape at a predetermined reading place while the magnetic recording tape is being transported by said tape driving means, and producing an electric signal representing said magnetic signal; and control means for starting to reproduce the information from said other recording track from a first point thereon when a second point, aligned with said first point, on said one recording track reaches said predetermined reading place while said one recording track is being played back, and for starting to reproduce the information from said one recording track from a third point thereon when a fourth point, aligned with said third point, on said other recording track is reached to said predetermined reading place while said other recording track is being played back.

16. An apparatus according to claim 15, further comprising:

command input means for providing a command to appoint a selected pair of said first and second points, and said third and fourth points, respectively;

acoustoelectric transducer means for transducing voice sound sung in relation to said musical accompaniment information into electric voice information; and information mixing means for mixing said musical accompaniment information with said electric voice information.

* * * * *